United States Patent
Tsai

(10) Patent No.: US 7,686,153 B2
(45) Date of Patent: Mar. 30, 2010

(54) PACKAGE TEMPORARY STORAGE CONTROL MECHANISM FOR A CUBOIDAL PACKAGE CONVEYING APPARATUS AND OPERATING METHOD THEREOF

(75) Inventor: Tung-I Tsai, Taoyuan (TW)

(73) Assignee: Chan Li Machinery Co., Ltd., Taoyuan (TW)

( * ) Notice: Subject to any disclaimer, the term of this patent is extended or adjusted under 35 U.S.C. 154(b) by 0 days.

(21) Appl. No.: 12/289,105

(22) Filed: Oct. 21, 2008

(65) Prior Publication Data
US 2010/0000840 A1    Jan. 7, 2010

(30) Foreign Application Priority Data
Jul. 1, 2008    (TW) ............... 97124779 A

(51) Int. Cl.
*B65G 1/00*    (2006.01)
(52) U.S. Cl. ............. 198/347.1; 198/429; 414/792.6; 414/788.9; 414/790.4
(58) Field of Classification Search ... 198/347.1–347.4, 198/418.6, 426, 428–430, 560–561; 414/788.9–789, 414/790.4, 791.1, 791.6, 793.4, 794.4, 794.3, 414/792.6
See application file for complete search history.

(56) References Cited
U.S. PATENT DOCUMENTS

| | | | | | |
|---|---|---|---|---|---|
| 3,360,100 | A | * | 12/1967 | Seragnoli | 198/347.3 |
| 3,499,555 | A | * | 3/1970 | Wahle | 198/347.3 |
| 3,603,462 | A | * | 9/1971 | Moser | 414/788.8 |
| 3,837,140 | A | * | 9/1974 | Golantsev et al. | 53/540 |
| 4,502,587 | A | * | 3/1985 | Clark | 198/347.1 |
| 5,366,063 | A | * | 11/1994 | Pollock | 198/347.3 |
| 2001/0025765 | A1 | * | 10/2001 | Ikegami | 198/347.1 |
| 2004/0050657 | A1 | * | 3/2004 | Langenegger et al. | 198/347.1 |

\* cited by examiner

*Primary Examiner*—Mark A Deuble
(74) *Attorney, Agent, or Firm*—Rosenberg, Klein & Lee

(57) ABSTRACT

A package temporary storage control mechanism is located between a feeding end and a discharge end of a cuboidal package conveying apparatus, and includes a temporary storage trough, which has two upright plates defining an upper supporting zone and a lower waiting zone therebetween. Two supporting mechanisms are driven to ascend and descend vertically in the supporting zone and each includes a plurality of supporting fingers that can be extended into the supporting zone to locate at a supporting position for receiving and supporting a plurality of cuboidal packages fed from the feeding end to the supporting zone. Two carrying mechanisms are driven to ascend and descend vertically in the waiting zone and each includes a plurality of carrier seats that can be extended into the waiting zone to locate at a carrying position for carrying the cuboidal packages moved downward from the supporting zone.

14 Claims, 23 Drawing Sheets

PACKAGE TEMPORARY STORAGE CONTROL MECHANISM FOR A CUBOIDAL PACKAGE CONVEYING APPARATUS AND OPERATING METHOD THEREOF

FIELD OF THE INVENTION

The present invention relates to the design of a cuboidal package conveying apparatus, and more particularly to the structure and operating method of a package temporary storage control mechanism for a cuboidal package conveying apparatus.

BACKGROUND OF THE INVENTION

According to a currently available cuboidal package conveying apparatus, cuboidal packages are first sent by a conveyor to a feeding end of the conveying apparatus, and then sent from the feeding end to a temporary storage trough. When a predetermined number of cuboidal packages has been collected and stacked in the temporary storage trough, the stacked cuboidal packages are sent as a batch by another conveyor to a next downstream workstation, so that the batch of the cuboidal packages including predetermined stacked layers with each of the layers containing a predetermined number of cuboidal packages is packed to form a large bundle. The cuboidal packages each may be, for example, toilet paper or paper handkerchiefs packed in one single small plastic bag, toilet paper or paper handkerchiefs packed in one single small cardboard box and so on.

However, with the conventional cuboidal package conveying apparatus, when the cuboidal packages have been sent to the temporary storage trough, a plurality of carrier seats in the temporary storage trough for carrying the cuboidal packages can only move vertically in the temporary storage trough. When the carrier seats have carried the cuboidal packages to a bottom of the temporary storage trough, they have to wait until a push plate on the conveyor comes to move the cuboidal packages out of the carrier seats to the downstream workstation. Then, the carrier seats are moved upward along the temporary storage trough to carry subsequent cuboidal packages. In this manner, increased time is needed to convey the cuboidal packages to result in poor working efficiency of the cuboidal package conveying apparatus.

Moreover, when any defective cuboidal packages are found during the course of conveyance, an operator has to dismount some parts of the cuboidal package conveying apparatus to remove the defective packages from the carrier seats. It is of course time and labor consuming to do so.

SUMMARY OF THE INVENTION

A primary object of the present invention is to provide a package temporary storage control mechanism for a cuboidal package conveying apparatus. The package temporary storage control mechanism is located between a feeding end and a discharge end of the cuboidal package conveying apparatus, and includes a plurality of carrier seats that can be controlled to freely move horizontally and vertically to save the time needed to convey the cuboidal packages, enabling the conveying apparatus to work at high efficiency.

Another object of the present invention is to provide a package temporary storage control mechanism for a cuboidal package conveying apparatus. The package temporary storage control mechanism is located between a feeding end and a discharge end of the cuboidal package conveying apparatus, and includes a plurality of carrier seats that can be controlled to return defective cuboidal packages to a predetermined position during the course of conveyance, so as to largely save the time needed to handle the defective packages.

A further object of the present invention is to provide a package temporary storage control mechanism for a cuboidal package conveying apparatus. The package temporary storage control mechanism is located between a feeding end and a discharge end of the cuboidal package conveying apparatus, and has a size-adjustable temporary storage trough to enable conveyance of cuboidal packages of various dimensions via the temporary storage trough.

To fulfill the above objects, the present invention provides a package temporary storage control mechanism, which is located between a feeding end and a discharge end of a cuboidal package conveying apparatus and includes a temporary storage trough. The temporary storage trough has two upright plates defining an upper supporting zone and a lower waiting zone therebetween. Two supporting mechanisms are driven to ascend and descend vertically in the supporting zone and each includes a plurality of supporting fingers that can be extended into the supporting zone to locate at a supporting position for receiving and supporting a plurality of cuboidal packages fed from the feeding end to the supporting zone. Two carrying mechanisms are driven to ascend and descend vertically in the waiting zone and each includes a plurality of carrier seats that can be extended into the waiting zone to locate at a carrying position for carrying the cuboidal packages moved downward from the supporting zone.

With the technical means adopted by the present invention, the carrier seats of the package temporary storage control mechanism can be controlled to freely move horizontally and vertically, enabling the cuboidal packages to be conveyed at reduced operating time, upgraded working efficiency, and increased productivity. Moreover, in the event of finding any defective or poorly stacked cuboidal packages during the course of conveyance, the whole control mechanism can be controlled to operate reversely, so that the defective packages can be returned to a predetermined position and removed by an operator from the conveying apparatus. Further, the temporary storage trough includes a movable upright plate to enable quick adjustment of the size of the temporary storage trough, so that the temporary storage trough is suitable for cuboidal packages of different sizes to pass therethrough.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
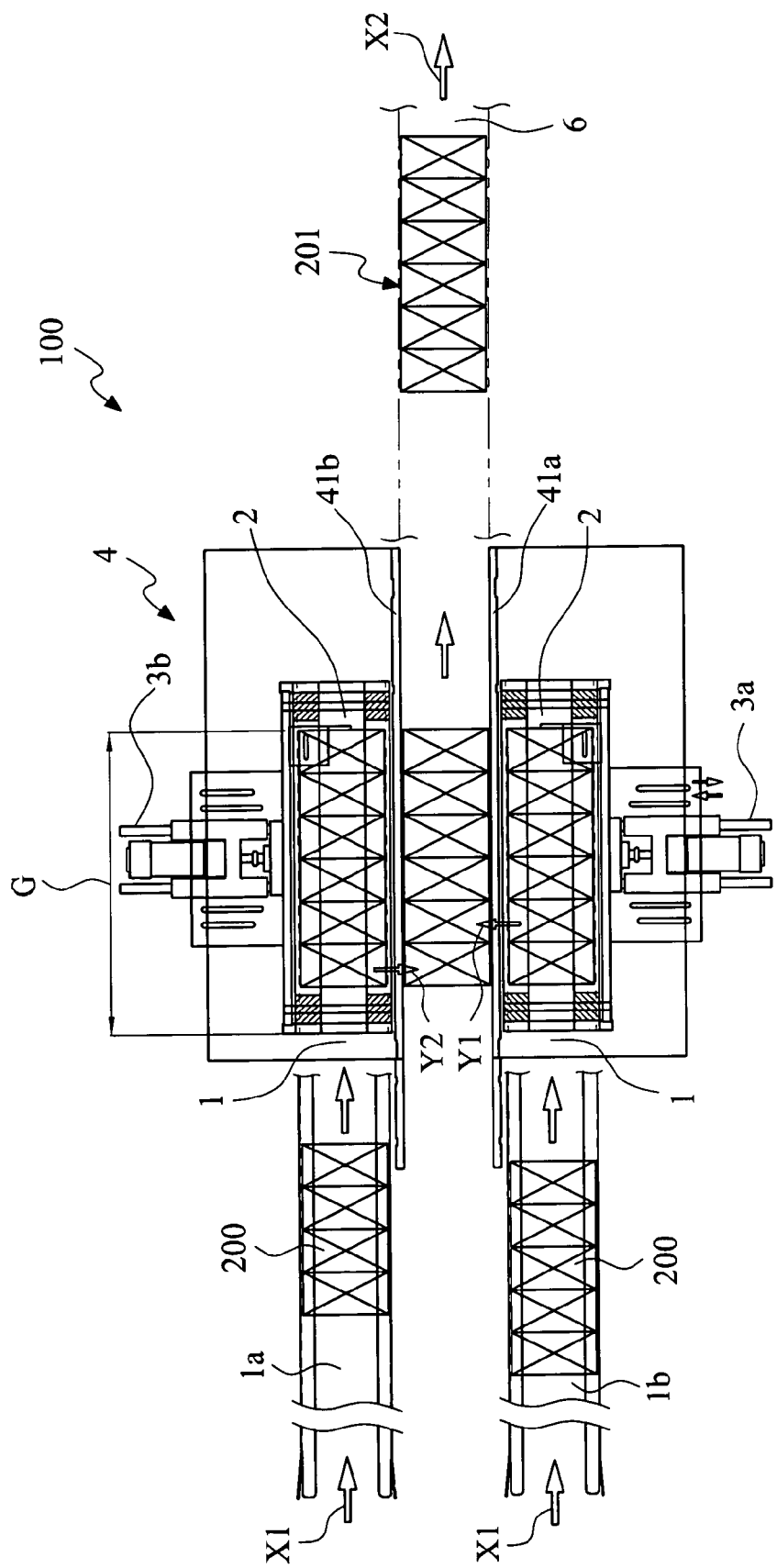
FIG. 1 is a schematic top view of a cuboidal package conveying apparatus of the present invention.
Figure 2:
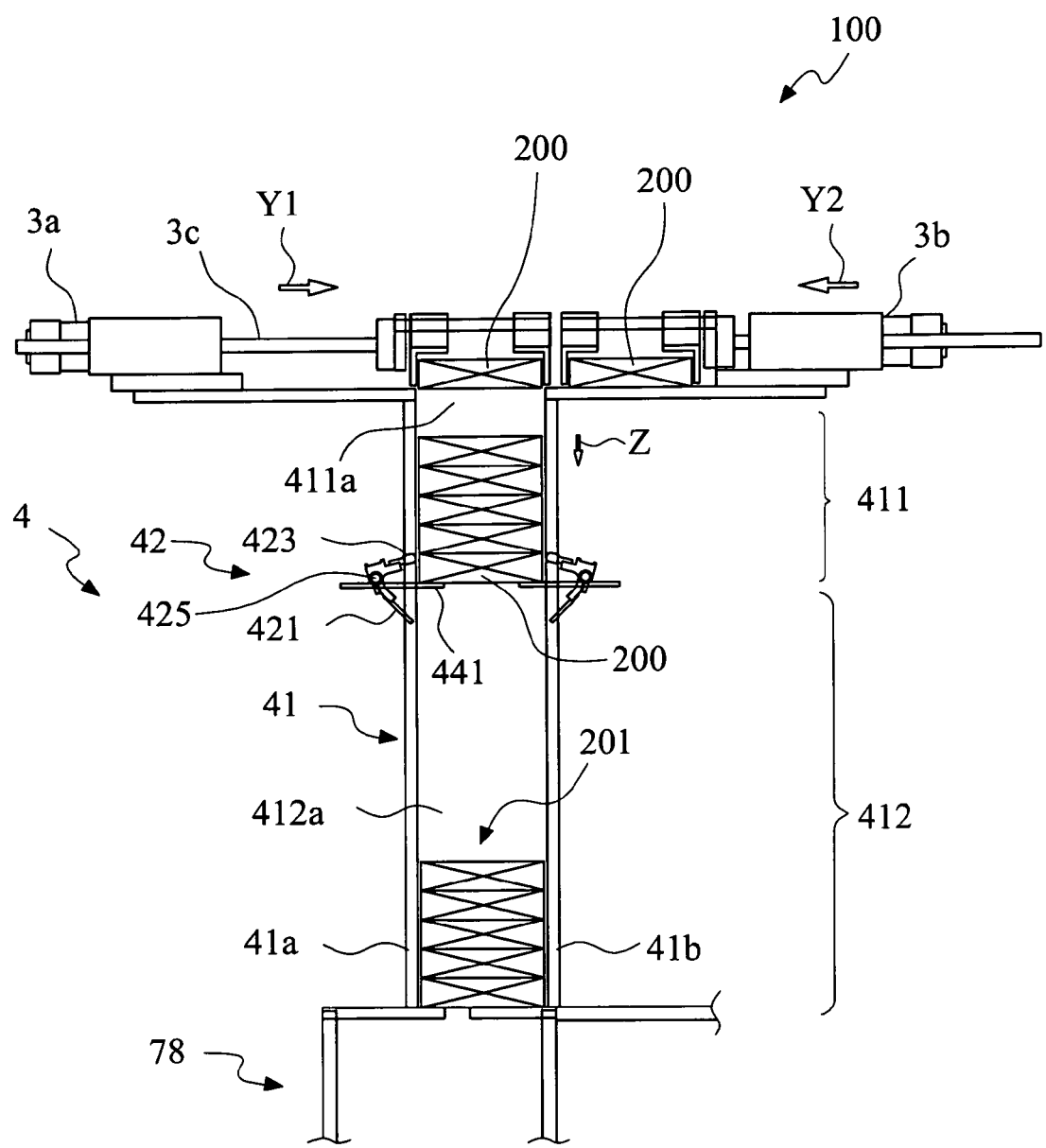
FIG. 2 is a schematic side view of the present invention.
Figure 3:
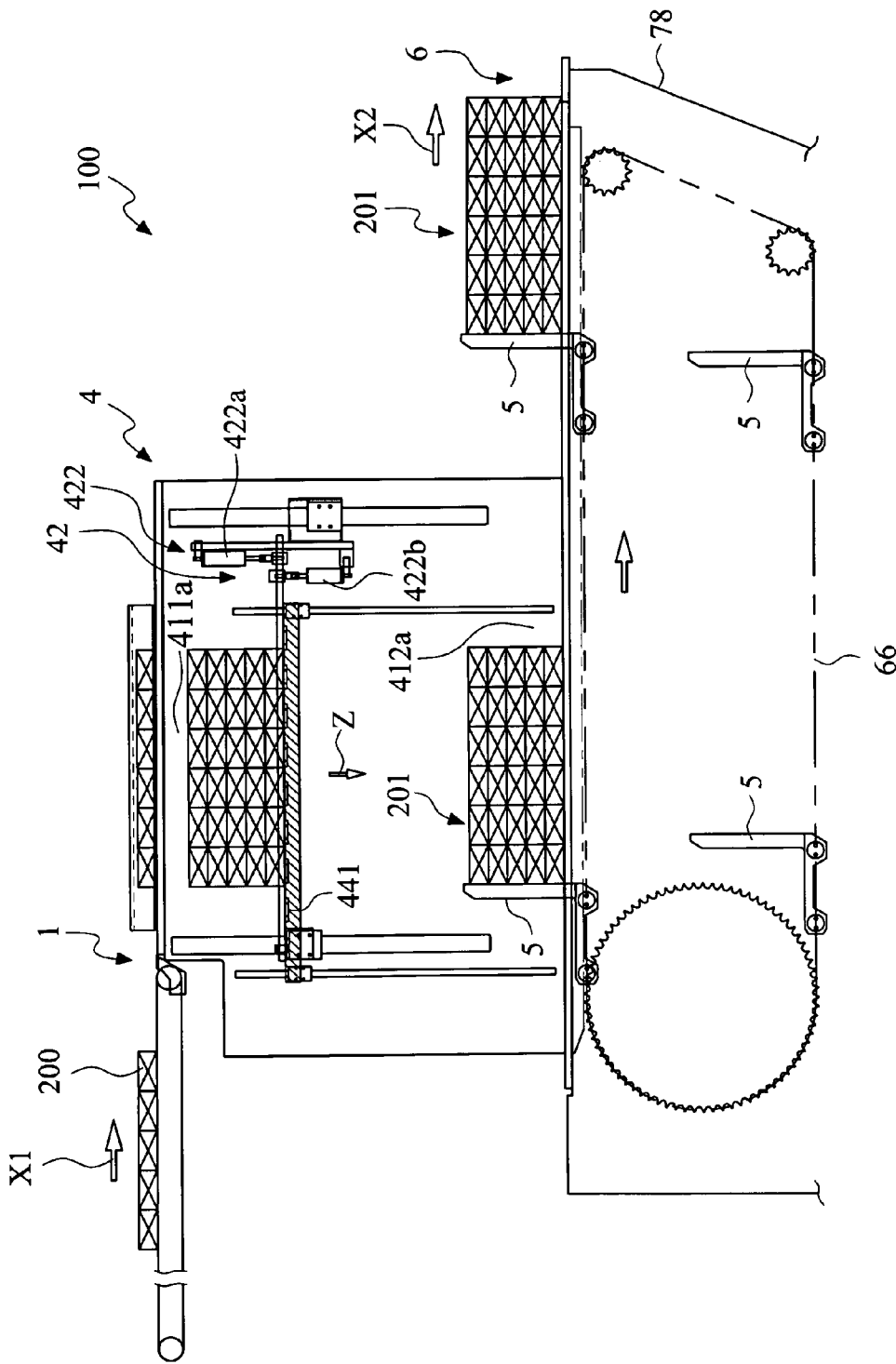
FIG. 3 is a schematic front view of the present invention.

Please refer to FIGS. 1 to 3, in which a cuboidal package conveying apparatus 100 and the movement of cuboidal packages into and out of the conveying apparatus 100 is shown. For the purpose of clarity, some of the parts in the drawings are shown with slant lines to help in distinguishing these parts from other parts. As shown, a plurality of cuboidal packages 200 is carried by conveyers 1a, 1b to move in a horizontal direction X1 and be fed into the conveying apparatus 100 at a feeding end 1 thereof. Alternatively, the cuboidal packages 200 can be conveyed only by the conveyer 1a or the conveyer 1b. Then, the cuboidal packages 200 passing through the feeding end 1 sequentially enter a storage zone 2. When a predetermined number of the cuboidal packages have entered the storage zone 2, one of two extension controller units 3a, 3b is turned on to push the predetermined number of cuboidal packages 200 in a direction Y1 or a direction Y2 toward a top of a temporary storage trough 41, as shown in FIG. 2. That is, the extension controller units 3a, 3b can operate alternately but not simultaneously. Then, the predetermined number of cuboidal packages 200 is descended in a vertical direction Z to a pair of supporting mechanisms 42, and further transferred from the supporting mechanisms 42 to a plurality of carrier seats 441. When predetermined layers, for example, five layers, of cuboidal packages 200 have been supported on the carrier seats 441, the predetermined layers of cuboidal packages 200 are carried as one batch 201 by the carrier seats 441 to descend in the vertical direction Z to a bottom of a waiting zone 412a in the temporary storage trough 41. The batch 201 in the waiting zone 412a is then pushed by a push plate 5 in a horizontal direction X2 to move through a discharge end 6 of the conveying apparatus 100 toward a next workstation, as shown in FIG. 3. The number of layers of the cuboidal packages 200 to be stacked on the carrier seats 441 to form one batch 201 can be preset according to actual need. The number of the cuboidal packages 200 in each layer can also be preset according to actual need. The cuboidal packages 200 each can be, for example, toilet paper or paper handkerchiefs packed in one single small plastic bag, toilet paper or paper handkerchiefs packed in one single small paper box and so on. There is a plurality of push plates 5 associated with an endless chain 66, which is driven by a chain wheel mounted on a base 78 to cyclically move along a fixed path.

Figure 4:
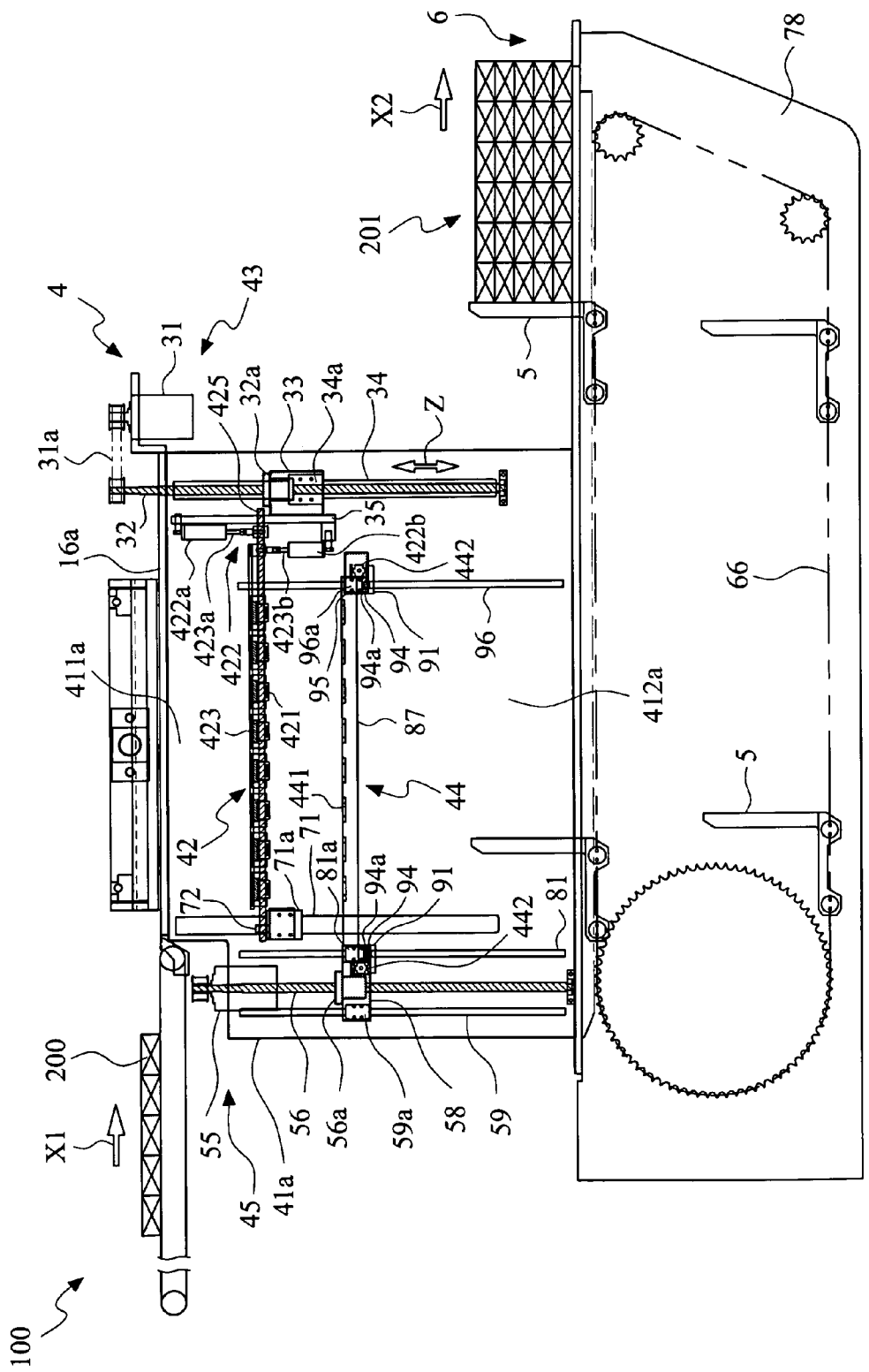
FIG. 4 is a front view of the present invention showing some major parts thereof.

Please refer to FIGS. 1 to 5 at the same time. A package temporary storage control mechanism 4 is provided on the conveying apparatus 100 between the feeding end 1 and the discharge end 6, as shown in FIGS. 1 and 3. The cuboidal packages 200 fed into the conveying apparatus 100 via the feeding end 1 pass through the package temporary storage control mechanism 4 and move out of the conveying apparatus 100 via the discharge end 6. The package temporary storage control mechanism 4 includes a temporary storage trough 41 as can be seen in FIG. 2, and a pair of supporting mechanisms 42, a supporting finger driving mechanism 43, a pair of carrying mechanisms 44, and a carrier seat driving mechanism 45 as can be seen in FIG. 4.

As shown in FIG. 2, the temporary storage trough 41 includes a pair of upright plates 41a, 41b. The upright plates 41a, 41b each are divided into a supporting section 411 and a waiting section 412 located below the supporting section 411. A supporting zone 411a is defined between the supporting sections 411 of the two upright plates 41a, 41b; and the waiting zone 412a is defined between the waiting sections 412 of the two upright plates 41a, 41b.

Figure 5:
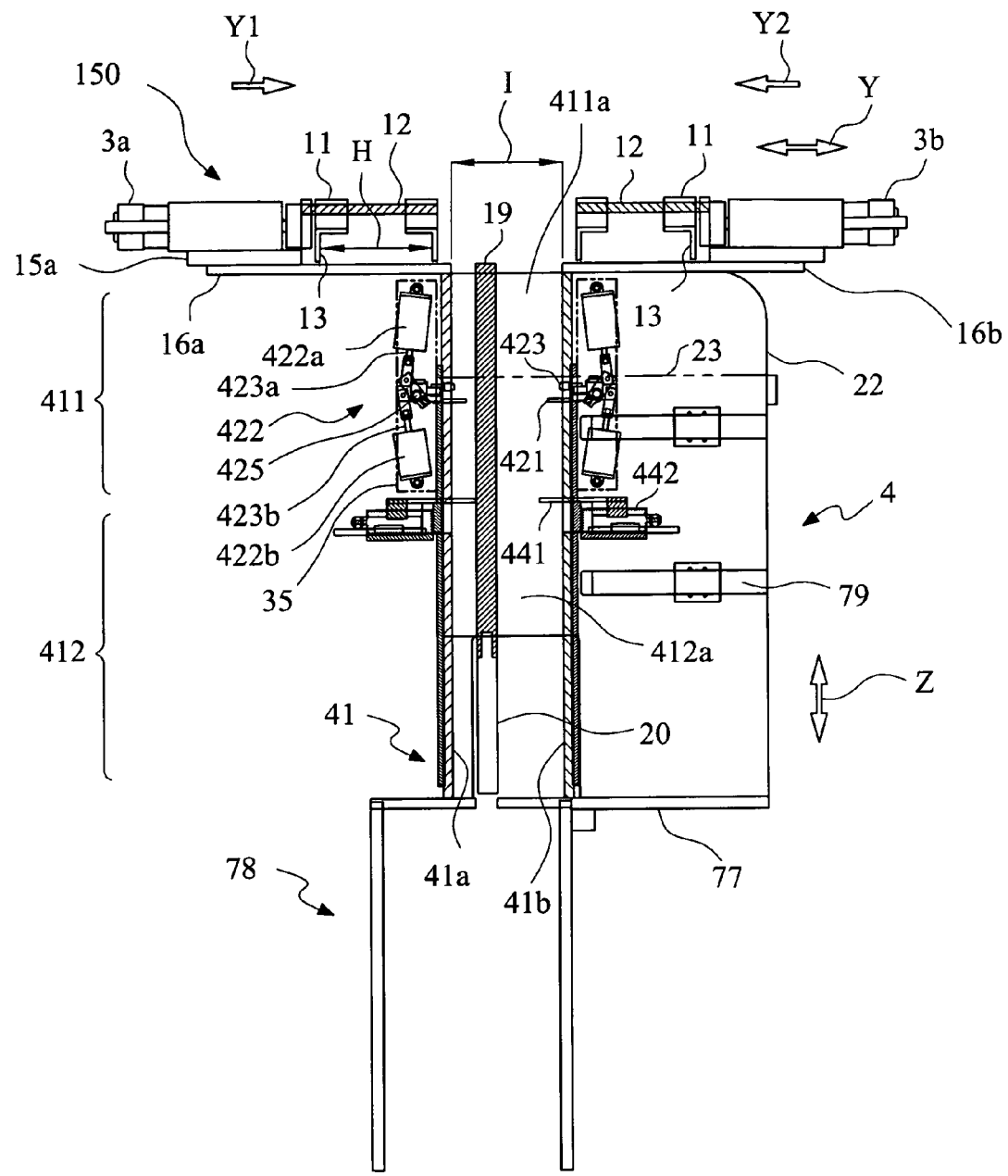
FIG. 5 is a side view of the present invention showing some major parts thereof.
Figure 15:
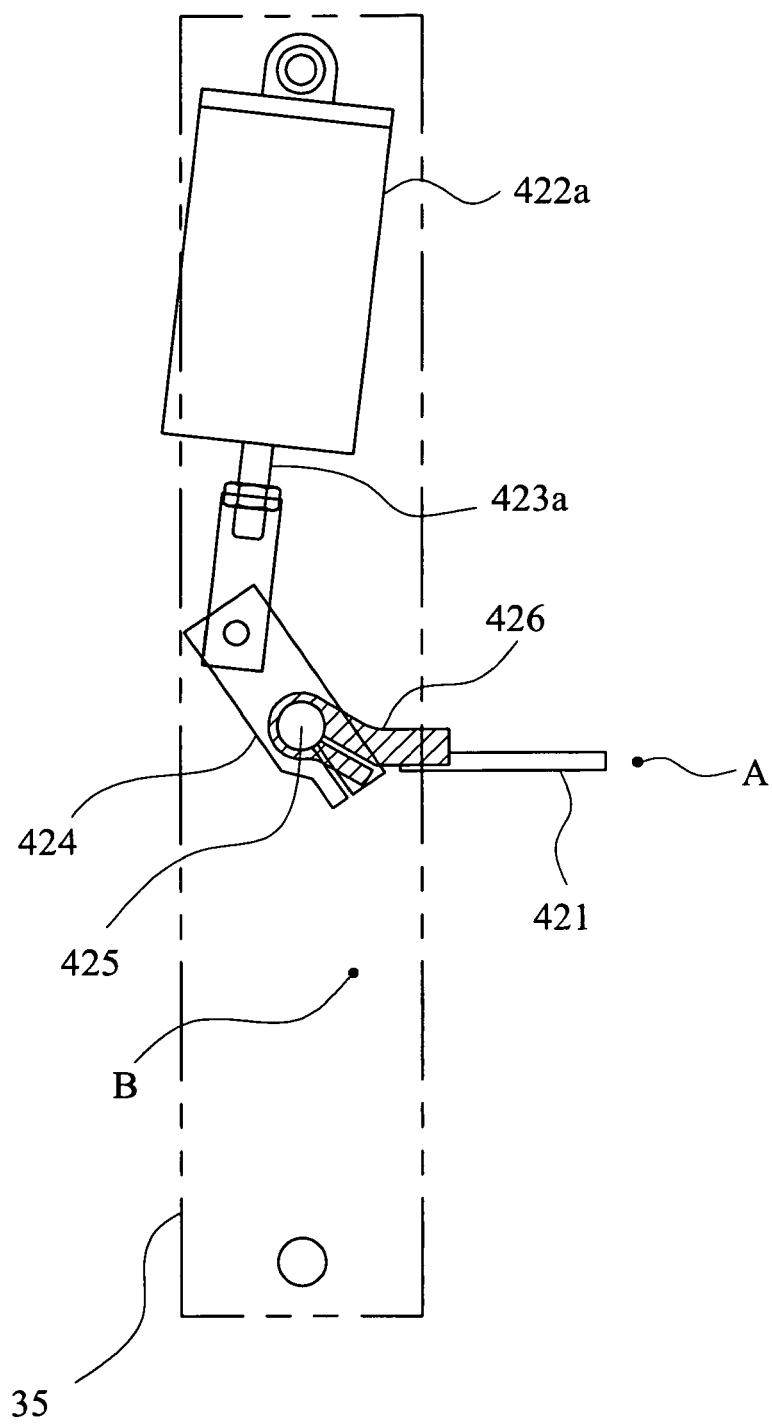
FIG. 15 is a schematic view showing the connection of the supporting fingers to an upper extension controller.
Figure 16:
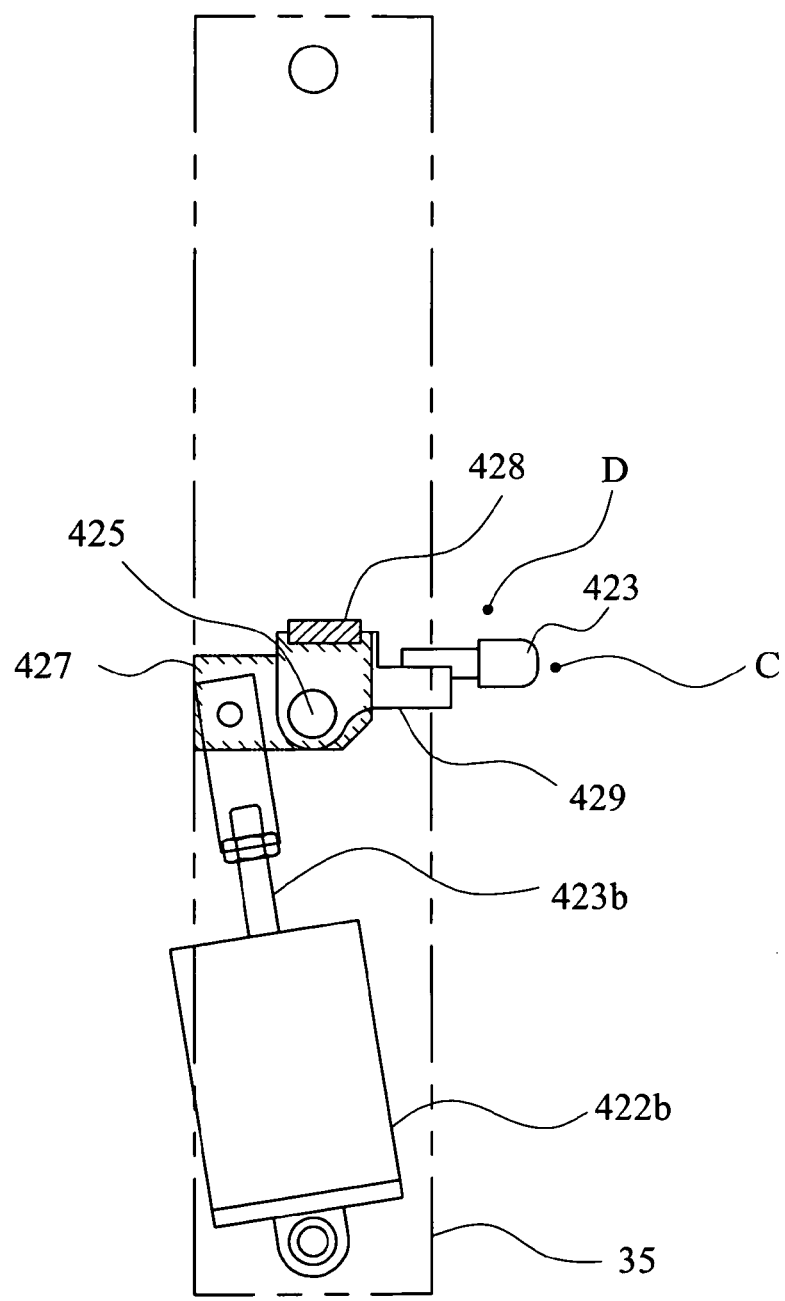
FIG. 16 is a schematic view showing the connection of the package retaining mechanisms to a lower extension controller.

The supporting mechanisms 42 each include a plurality of supporting fingers 421, at least one extension controller mechanism 422, and a plurality of retaining mechanisms 423, as shown in FIGS. 4 and 5. The extension controller mechanism 422 each includes an upper extension controller 422a and a lower extension controller 422b. The supporting fingers 421 are controlled by the upper extension controller 422a of the extension controller mechanism 422 to locate at a supporting position A or a releasing position B, as shown in FIG. 15. The supporting fingers 421 located at the supporting position A are extended into the supporting zone 411a of the temporary storage trough 41, as shown in FIG. 5, so as to receive and support the cuboidal packages 200 that are fed at the feeding end 1 to pass through the storage zone 2 and be moved into the supporting zone 411a. The retaining mechanisms 423 are controlled by the lower extension controller 422b of the extension controller mechanism 422 to locate at a retaining position C or an opening position D, as shown in FIG. 16. The retaining mechanisms 423 at the retaining position C are extended into the supporting zone 411a of the temporary storage trough 41, as shown in FIG. 5, so as to contact and retain the cuboidal packages 200 that are fed at the feeding end 1 to pass through the storage zone 2 and be moved into the supporting zone 411a. The supporting finger driving mechanism 43 is coupled with the supporting mechanisms 42, as shown in FIG. 4, so as to drive the supporting mechanisms 42 to ascend and descend in the vertical direction Z along the supporting section 411 of the temporary storage trough 41.

Figure 20:
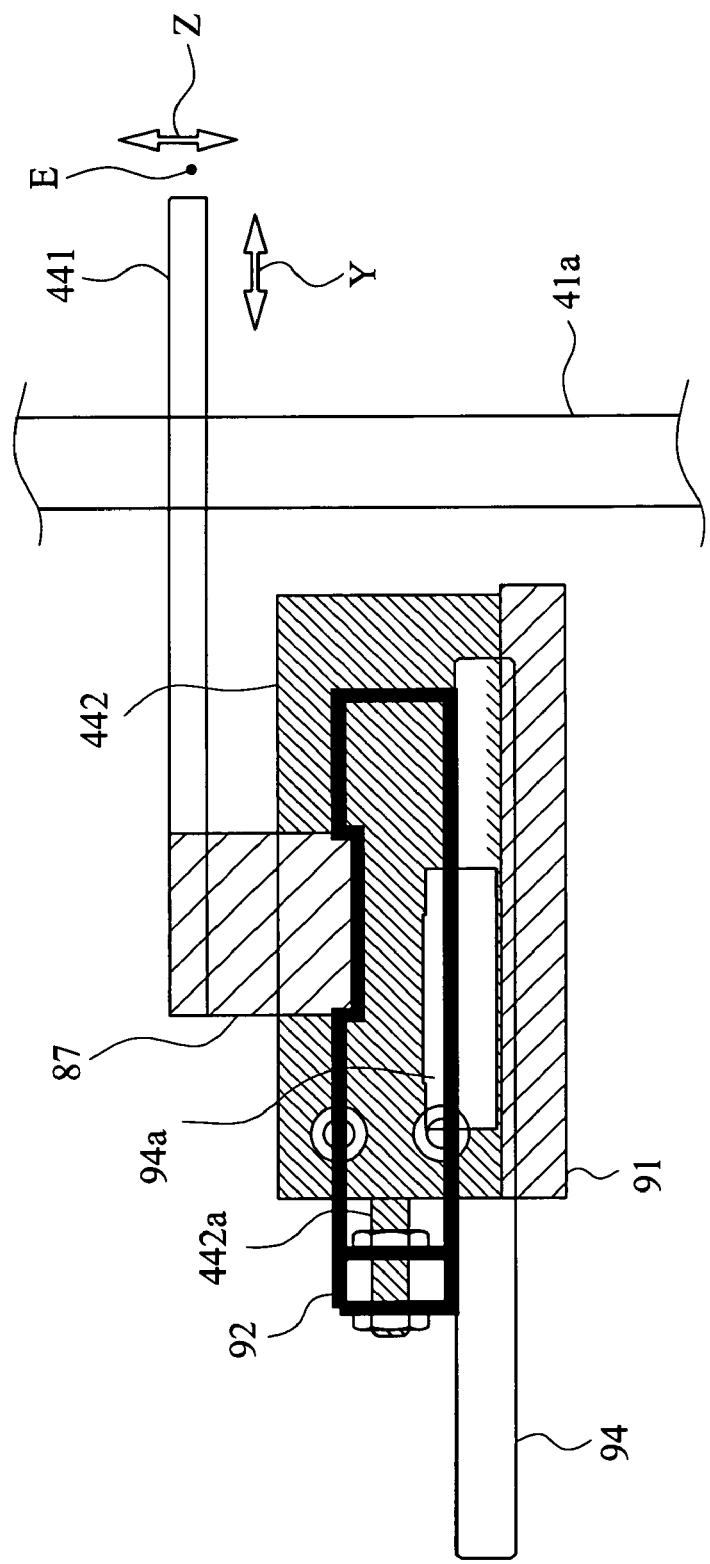
FIG. 20 is a schematic side view showing the carrier seats are controlled by a horizontal-extension controller to locate at a carrying position.
Figure 21:
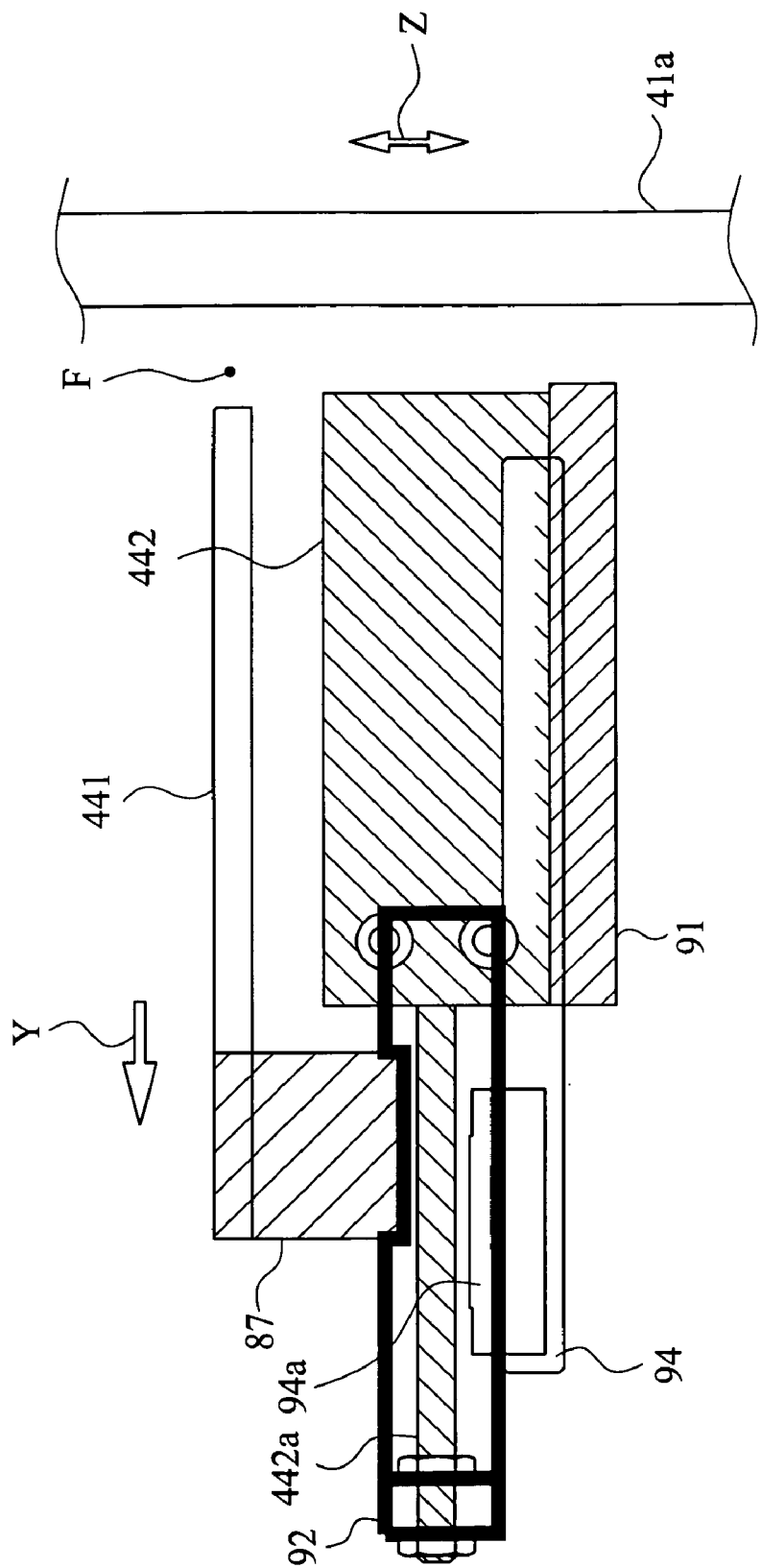
FIG. 21 is a schematic side view showing the carrier seats are controlled by the horizontal-extension controller to locate at a retracted position.

The carrying mechanisms 44 each include a plurality of carrier seats 441 and at least one horizontal-extension controller 442, as shown in FIGS. 4 and 5. The carrier seats 441 are controlled by the horizontal-extension controller 442 to locate at a carrying position E or a retracted position F, as shown in FIGS. 20 and 21. The carrier seats 441 located at the carrying position E are extended into the waiting zone 412a of the temporary storage trough 41, as shown in FIGS. 2 and 5, so as to carry the cuboidal packages 200 that are descended from the supporting zone 411a of the temporary storage trough 41 when the supporting fingers 421 are extended to the releasing position B. The carrier seat driving mechanism 45 is coupled with the carrying mechanisms 44, as shown in FIG. 4, so as to drive the carrying mechanisms 44 to ascend and descend in the vertical direction Z along the waiting section 412 of the temporary storage trough 41. When the carrying mechanisms 44 are driven by the carrier seat driving mechanism 45 to move to the bottom of the waiting zone 412a, the batch 201 that is carried by the carrier seats 441 to the waiting zone 412a of the temporary storage trough 41 is pushed by one of the push plates 5 toward the discharge end 6 and discharged from the conveying apparatus 100 via the discharge end 6.

Figure 6:
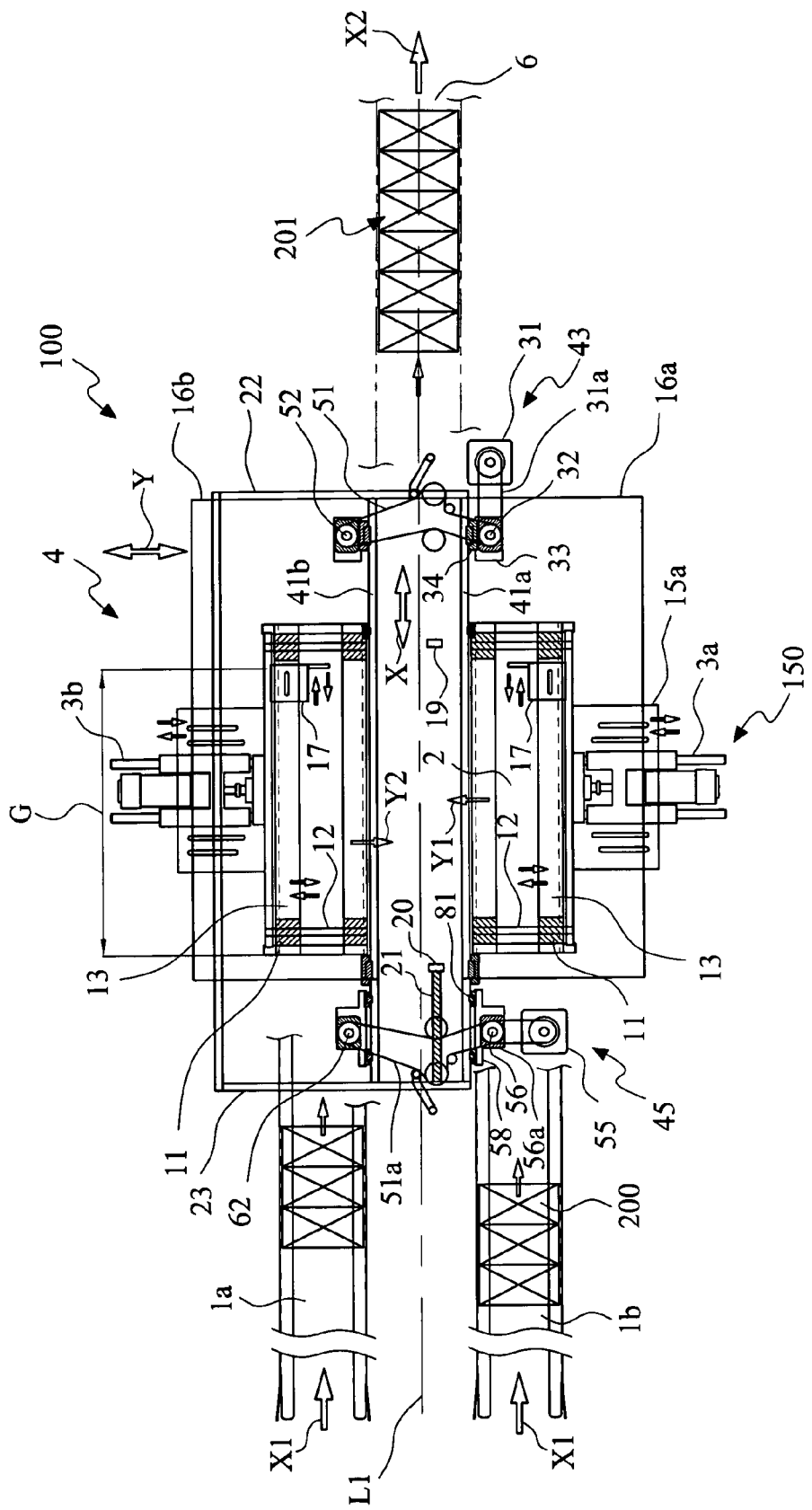
FIG. 6 is a top view of the present invention showing some major parts thereof.
Figure 7:
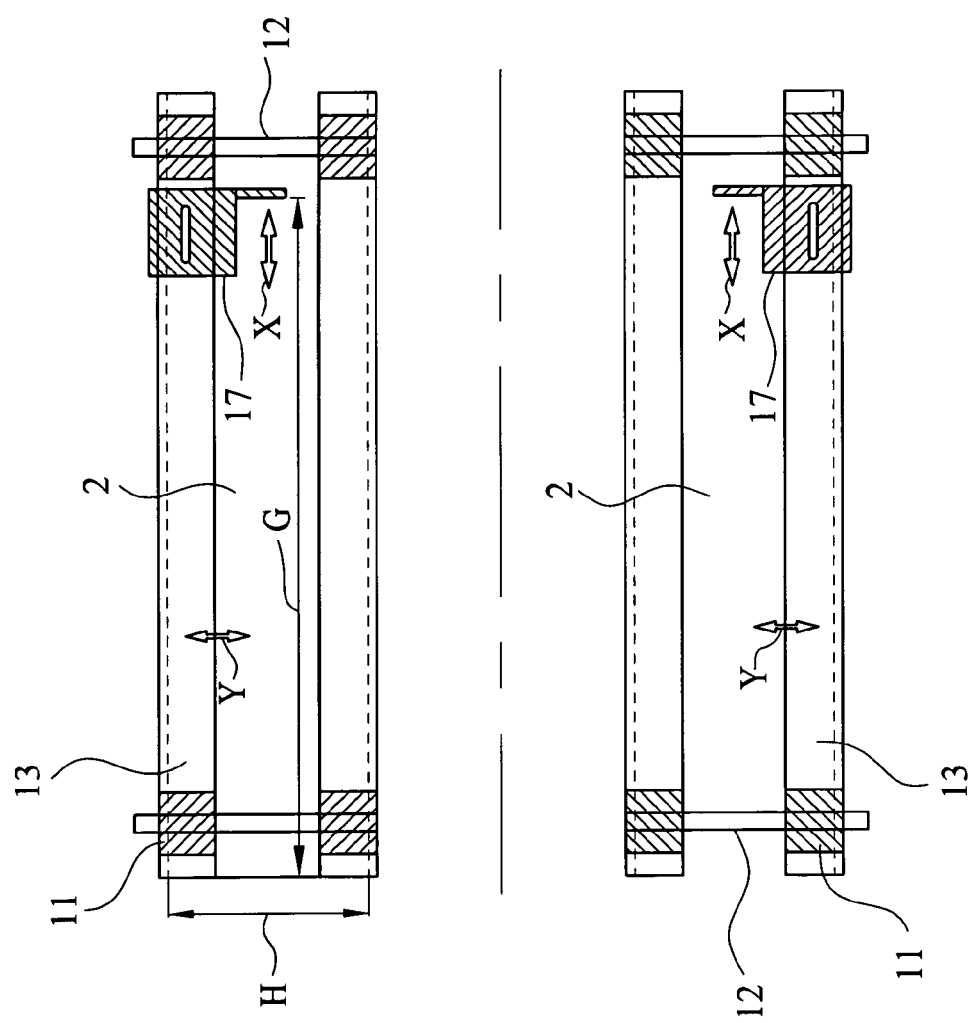
FIG. 7 is a top view showing some major parts in an extension controller package-pushing unit included in the present invention.
Figure 8:
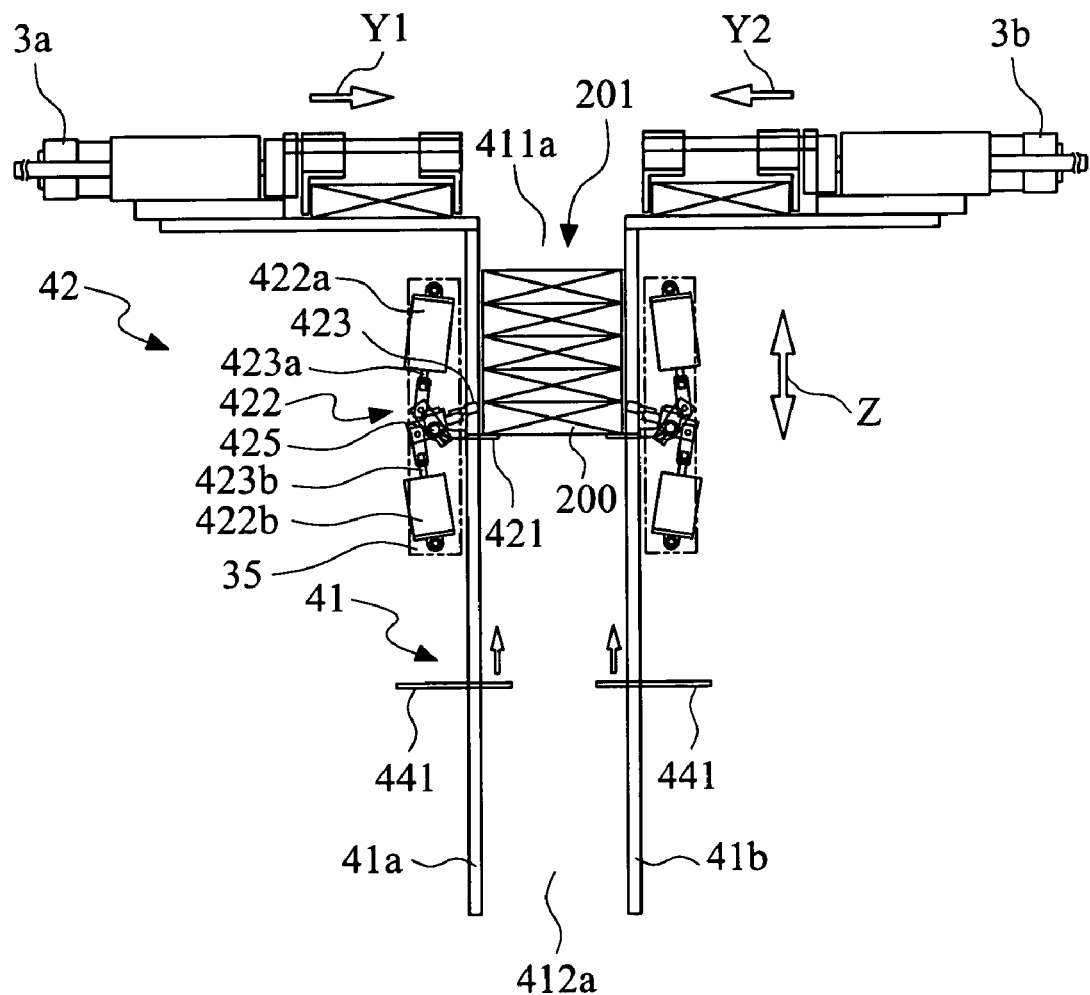
FIG. 8 is a schematic view showing predetermined layers of cuboidal packages are received and supported by a plurality of supporting fingers included in a pair of supporting mechanisms of the present invention.

Please refer to FIGS. 5 to 7. For the purpose of receiving and stacking differently sized cuboidal packages 200 to form differently sized batches 201 of the cuboidal packages 200, the package temporary storage control mechanism 4 of the conveying apparatus 100 allows quick size adjustment of the temporary storage trough 41. A set of two extension controller package-pushing units 150 shown in FIG. 6 are provided for pushing a predetermined number of cuboidal packages 200 located in one layer in the direction Y1 or the direction Y2, so that the cuboidal packages 200 are moved to the top of the temporary storage trough 41, as shown in FIGS. 2 and 6. Please refer to FIGS. 5 and 7. The extension controller package-pushing units 150 each includes at least one slide 11, which is slidable along a corresponding shaft 12 in a direction Y within a predetermined distance, so as to bring an L-shaped guide plate 13 to move in the direction Y at the same time to thereby adjust a span H of the storage zone 2 to match different lengths of the cuboidal packages 200. The extension controller package-pushing units 150 each further includes a stop plate 17, which is slidable along the L-shaped guide plate 13 in a direction X, as shown in FIG. 7, so as to adjust an overall length G of the storage zone 2 to match different widths of the cuboidal packages 200. Therefore, an operator can adjust the number of cuboidal packages 200 to be received in the storage zones 2, so that at least one cuboidal package 200 is received in each of the storage zones 2. The shafts 12 each is indirectly connected to an extension controller unit 3a or 3b via connecting elements, as shown in FIG. 5. The extension controller unit 3a is associated with a base plate 15a which is movably connected to a left table 16a to allow adjustment of a connecting position of the base plate 15a to the left table 16a, so that an extension controller arm 3c can be extended to a predetermined position, as shown in FIG. 2, to exactly push the cuboidal packages 200 of different sizes to the top of the temporary storage trough 41.

As can be seen from FIG. 5, the left table 16a is connected to the upright plate 41a, while a right table 16b is connected to the upright plate 41b. The left table 16a described herein is a fixed side, and the right table 16b is a movable side. At least one ninth sliding rail 79 is fixed to a right stop plate 22. The upright plate 41b and the right table 16b can synchronously move along the ninth sliding rail 79 in the direction Y within a predetermined distance, so that the upright plate 41b is controllably moved to adjust a distance I between the upright plate 41b and the upright plate 41a corresponding to different lengths of the cuboidal packages 200, ensuring that all the cuboidal packages 200 of different lengths can fall onto the supporting mechanisms 42. There is also a left stop plate 23 having a sliding rail symmetric to the ninth sliding rail 79 on the right stop plate 22. Please refer to FIG. 6 along with FIG. 5. The temporary storage trough 41 is internally provided with a movable upright guide plate 19 and a fixed upright guide plate 20. The movable upright guide plate 19 and the fixed upright guide plate 20 are parallel with each other, and are extended in a direction the same as an extending direction of the upright plates 41a, 41b. The movable upright guide plate 19 can be controlled to move in the direction X, so as to adjust a distance between it and the fixed upright guide plate 20 corresponding to the adjustment of the length G of the storage zone 2. With these adjustments, a whole layer of the cuboidal packages 200 can be guided by the movable and the fixed upright guide plates 19, 20 to vertically descend from the top of the temporary storage trough 41 without the risk of becoming deviated. The fixed upright guide plate 20 is connected to the left stop plate 23 via a connecting plate 21, as shown in FIG. 6. The movable upright guide plate 19 is connected to a connecting rod (not shown), which is movable in a sleeve (not shown) on the right stop plate 22 to thereby bring the movable upright guide plate 19 to move along with the connecting rod. The left stop plate 23 and the right stop plate 22 are separately connected to the upright plate 41a. The upright plate 41a is associated with the base 78 via connecting elements, as shown in FIG. 5. The left and the right stop plate 23, 22 are also connected to a right horizontal plate 77, which is associated with the base 78 via connecting elements, too.

FIGS. 8 to 14 show the process of receiving and stacking a predetermined quantity of cuboidal packages 200 to form one batch 201 of the cuboidal packages 200. Please refer to FIG. 8. Layer by layer, the cuboidal packages 200 are sequentially fallen onto the supporting fingers 421 extended into the supporting zone 411a in the temporary storage trough 41. In the process of receiving and supporting the cuboidal packages 200, the supporting fingers 421 of the supporting mechanisms 42 and the retaining mechanisms 423 are slowly descended in the vertical direction Z at a rate the same as a rate at which the cuboidal packages 200 in each layer are fallen onto the supporting mechanisms 42. When the predetermined layers of cuboidal packages 200, such as five layers, have been nearly reached, the carrier seat driving mechanism 45 will drive the carrier seats 441 of the carrying mechanisms 44 to ascend in the vertical direction Z.

Figure 9:
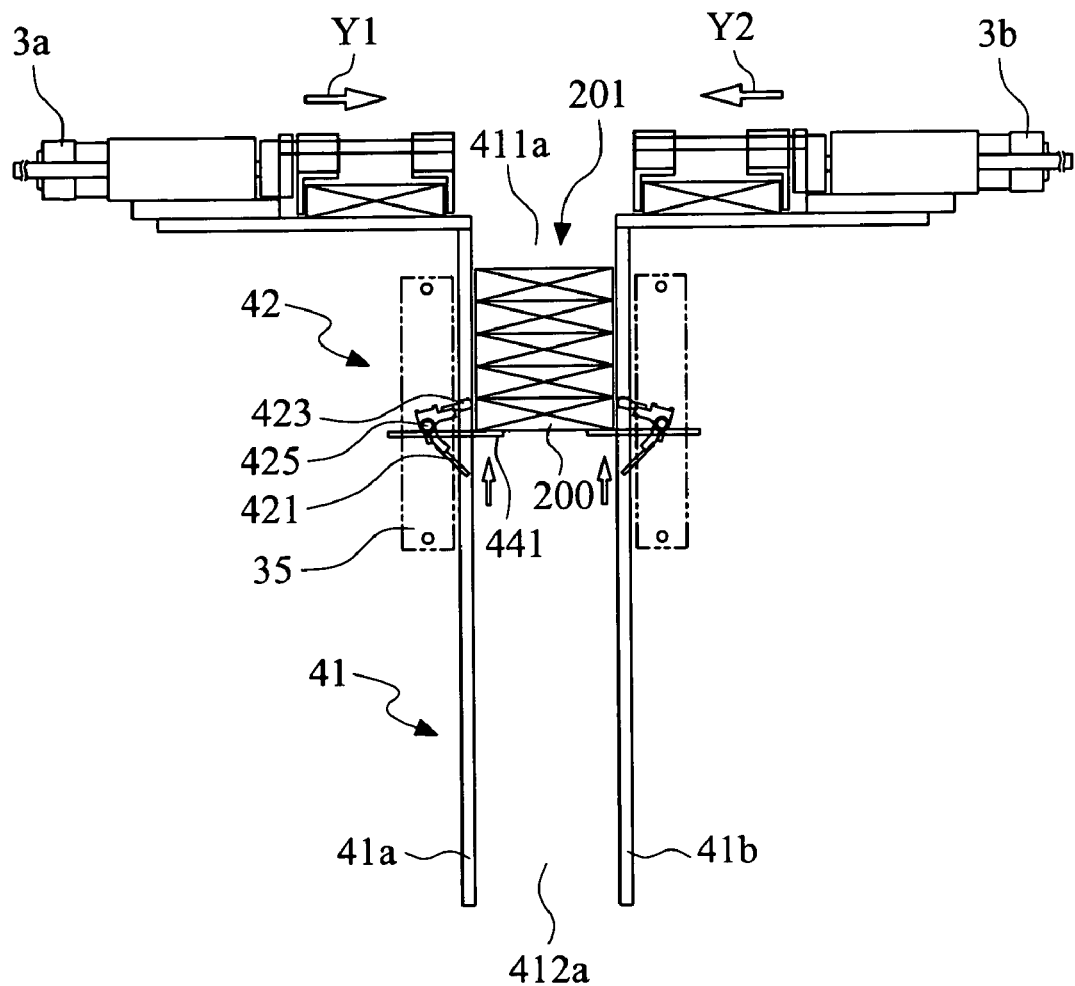
FIG. 9 is a schematic view showing the cuboidal packages are transferred from the supporting fingers to a plurality of carrier seats and the supporting fingers are controlled to move away from the cuboidal packages.

Please refer to FIG. 9. When the carrier seats 441 reaches the bottom of the batch 201 to bear the batch 201, the supporting fingers 421 are driven to rotate downward and move away from the batch 201. The batch 201 is completely supported by the carrier seats 441.

Figure 10:
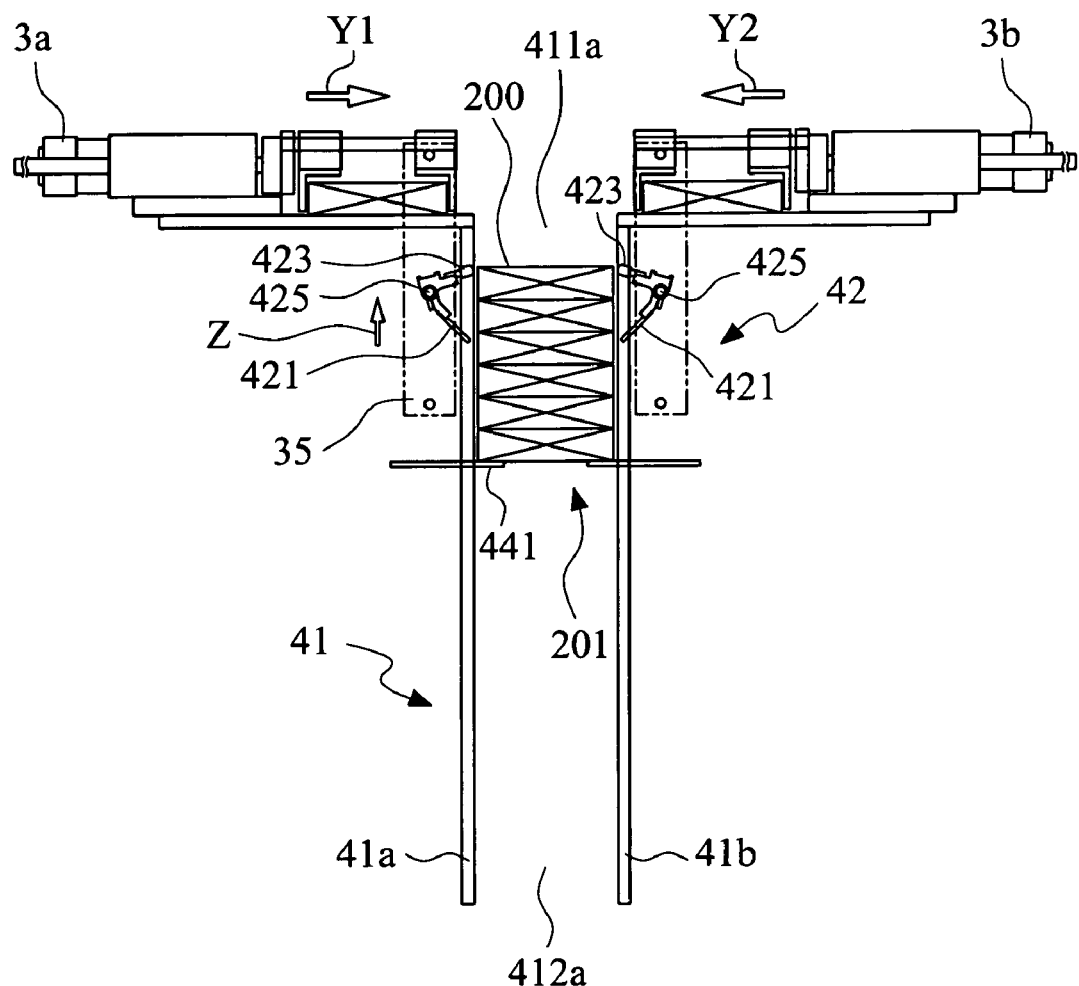
FIG. 10 shows the carrier seats with the cuboidal packages transferred from the supporting fingers keep receiving one more layer of cuboidal packages sent to a top of a supporting zone, and the supporting mechanisms are ascended.

FIG. 10 shows the batch 201 of the cuboidal packages 200 in FIG. 9 is now completely carried by the carrier seats 441. At this point, the supporting fingers 421 and the retaining mechanisms 423 are brought by a pair of extension controller plates 35 of the supporting mechanisms 42 to ascend in the vertical direction Z to a predetermine position, and the carrier seats 441 keep receiving a subsequent layer of cuboidal packages 200 that is pushed into the supporting zone 411a. The supporting mechanisms 42 each includes at least one extension controller plate 35, which is coupled with the supporting fingers 421 and the retaining mechanisms 423 via a shaft rod 425, as can be seen from FIG. 4.

Figure 11:
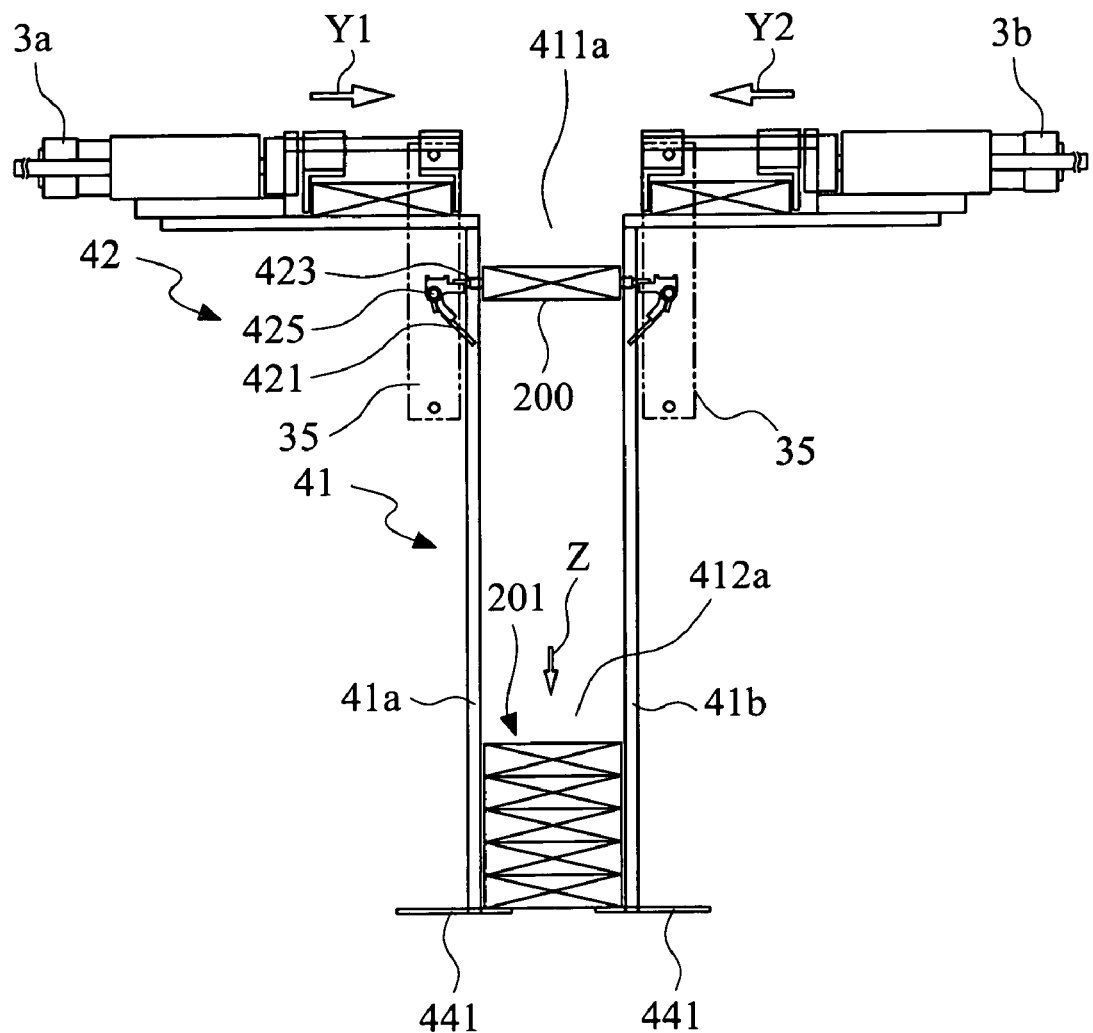
FIG. 11 is a schematic view showing that a plurality of package retaining mechanisms in the supporting mechanisms are pressed against the uppermost layer of cuboidal packages in FIG. 10 and the carrier seats carry the remaining cuboidal packages as one batch to a waiting zone in a temporary storage trough for discharging later.

In FIG. 11, the supporting fingers 421 and the retaining mechanisms 423 are brought by the extension controller plates 35 to ascend to a predetermined position. At this point, the retaining mechanisms 423 are turned downward to just contact two sides of the cuboidal packages 200 in the layer atop the batch 201; and the batch 201 containing the predetermined layers, such as five layers, of cuboidal packages 200 descends along with the carrier seats 441 in the vertical direction Z to the waiting zone 412a to be pushed by the push plate 5 to the discharge end 6, as shown in FIG. 3.

Figure 12:
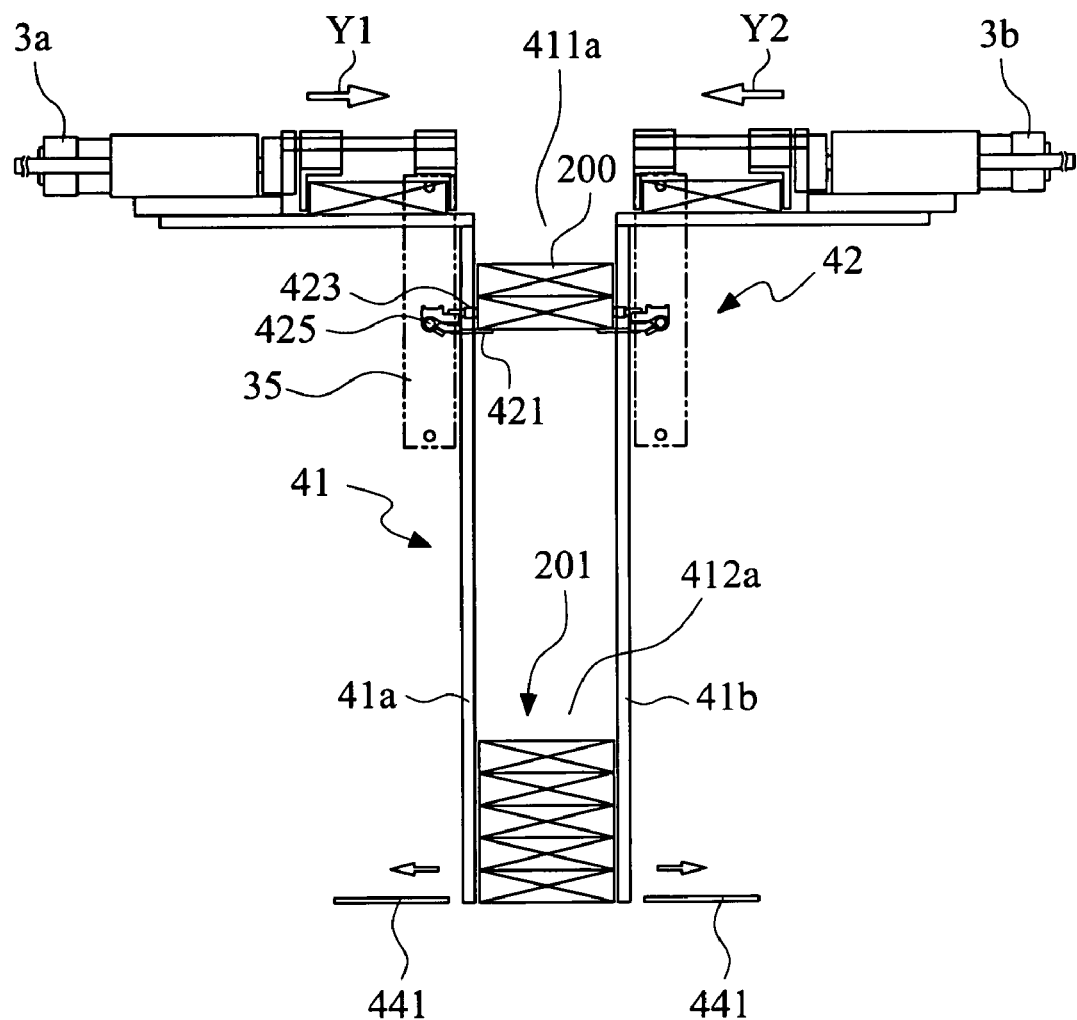
FIG. 12 schematically shows the supporting fingers are controlled to extend into the temporary storage trough to assist the package retaining mechanisms in supporting subsequent cuboidal packages.

In FIG. 12, the supporting fingers 421 are turned upward to help the retaining mechanisms 423 in supporting the subsequent layers of cuboidal packages 200. On the other hand, the carrier seats 441 descended to the bottom of the temporary storage trough 41 are moved out of the temporary storage trough 41.

Figure 13:
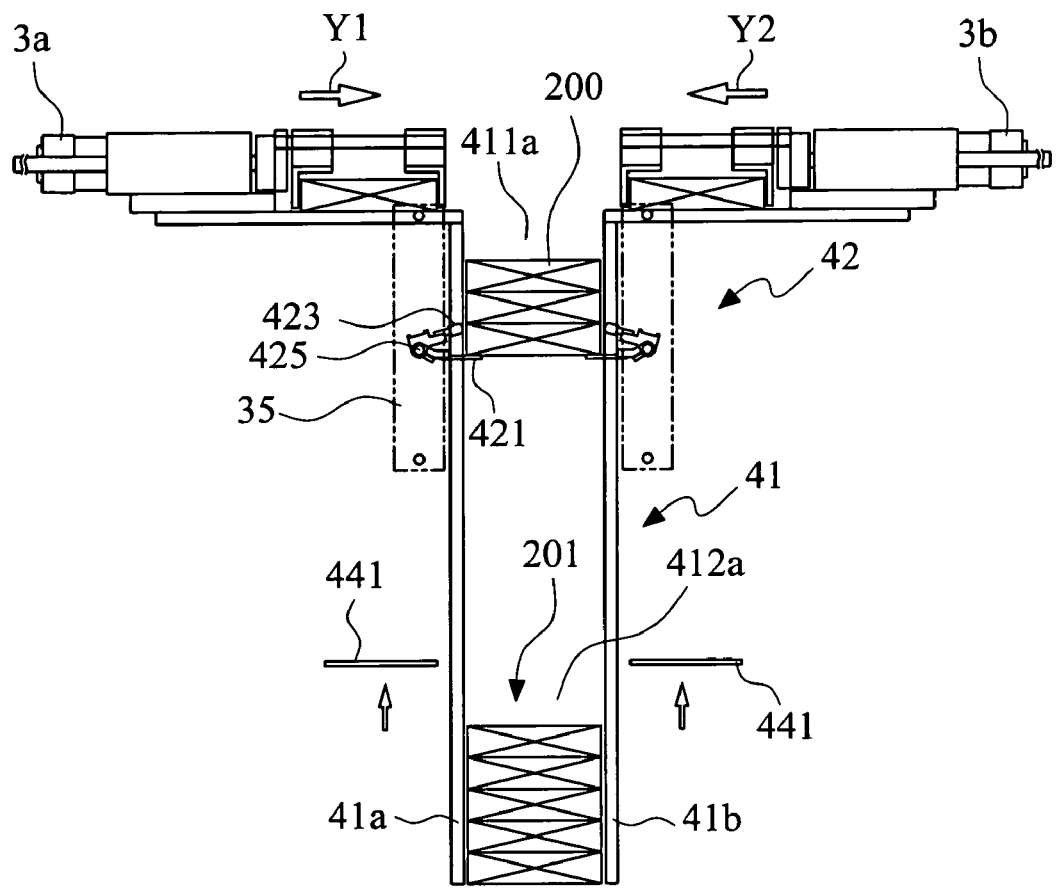
FIG. 13 schematically shows the package retaining mechanisms are controlled to move away from the cuboidal packages.

In FIG. 13, the retaining mechanisms 423 are turned upward to separate from the cuboidal packages 200 when the supporting fingers 421 start receiving and supporting the cuboidal packages 200. At this point, the cuboidal packages 200 moved into the supporting zone 411a are supported by the supporting fingers 421 alone. Also, the carrier seats 441 moved out of the temporary storage trough 41 are ascended to a predetermined height.

Figure 14:
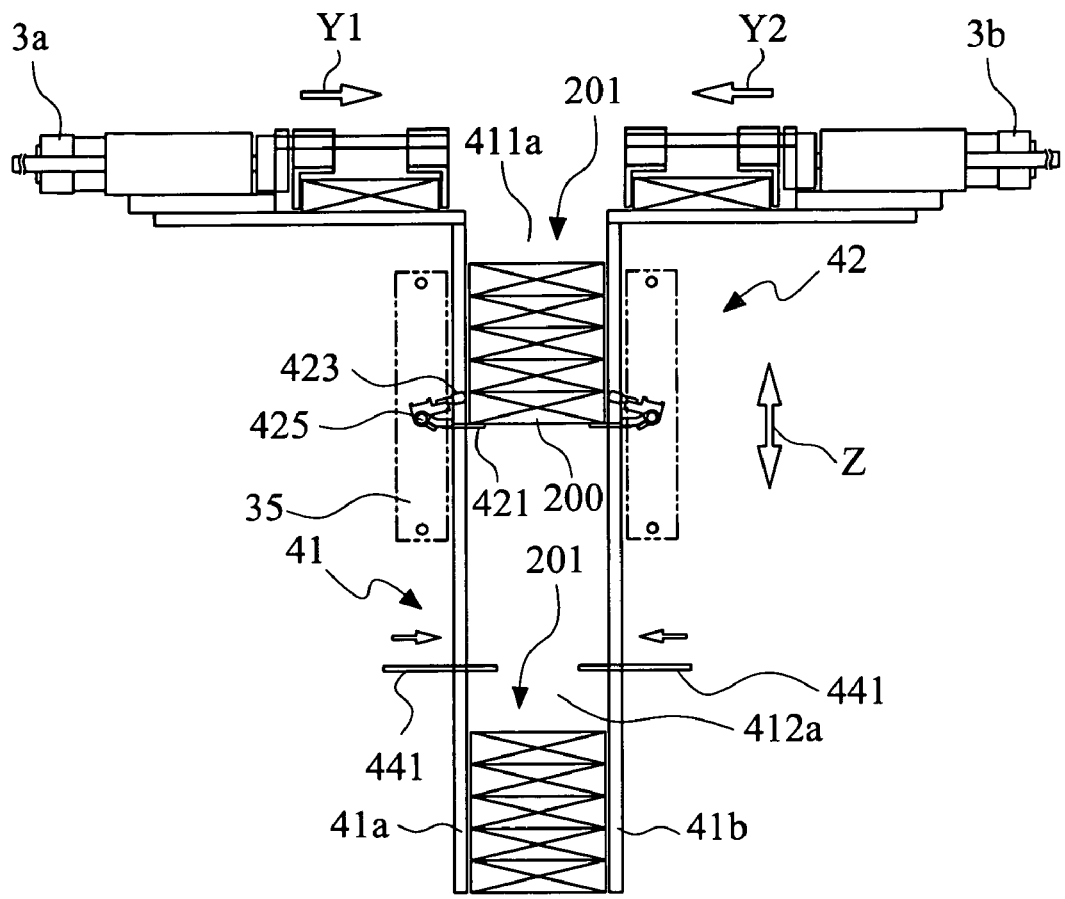
FIG. 14 shows the supporting fingers keep receiving and supporting subsequent cuboidal packages.

In FIG. 14, the supporting fingers 421 keep receiving and supporting subsequent cuboidal packages 200. Moreover, when the carrier seats 441 have ascended to the predetermined height, they are moved toward the temporary storage trough 41 and extended into the latter by a predetermined distance. When the predetermined layers of cuboidal packages 200, such as five layers, have been nearly stacked on the supporting fingers 421, the carrier seats 441 are actuated to ascend in the vertical direction Z to complete one cycle of operation of the package temporary storage control mechanism 4. In the event any defective or poorly stacked cuboidal packages 200 are found, the package temporary storage control mechanism 4 can be controlled to reverse the operation thereof at any time. That is, the carrier seats 441 of the carrying mechanisms 44 are ascended in the vertical direction Z, and may be moved to the top of supporting zone 411a if needed, so that the defective cuboidal packages 200 can be conveniently returned to a predetermined position, allowing an operator to remove the defective packages 200. Or, in the event of an abnormal power-off or shut-down during the course of operating, the package temporary storage control mechanism 4 will first return the cuboidal packages 200 to their initial position in the temporary storage trough 41 when the whole conveying apparatus 100 is started again, and then the package temporary storage control mechanism 4 starts the normal operation thereof as described above.

Please refer to FIGS. 15 and 16 that show the extension controller mechanism 422 in more details. The extension controller mechanism 422 includes an upper extension controller 422a and a lower extension controller 422b. The upper extension controller 422a has an upper extension controller arm 423a, which can be extended or retracted to control an upper connecting block 424 to rotate the shaft rod 425 and accordingly, a plurality of supporting finger holders 426 coupled with the shaft rod 425. Since the supporting fingers 421 are separately associated with the supporting finger holders 426, the supporting fingers 421 will rotate along with the supporting finger holders 426. The lower extension controller 422b has a lower extension controller arm 423b, which can be extended or retracted to control a lower connecting block 427 to rotate. Via an elongated key 428, the rotating lower connecting block 427 brings a plurality of retaining mechanism holders 429 to rotate synchronously. Since the retaining mechanisms 423 are separately associated with the retaining mechanism holders 429, the retaining mechanisms 423 will rotate along with the retaining mechanism holders 429.

Figure 17:
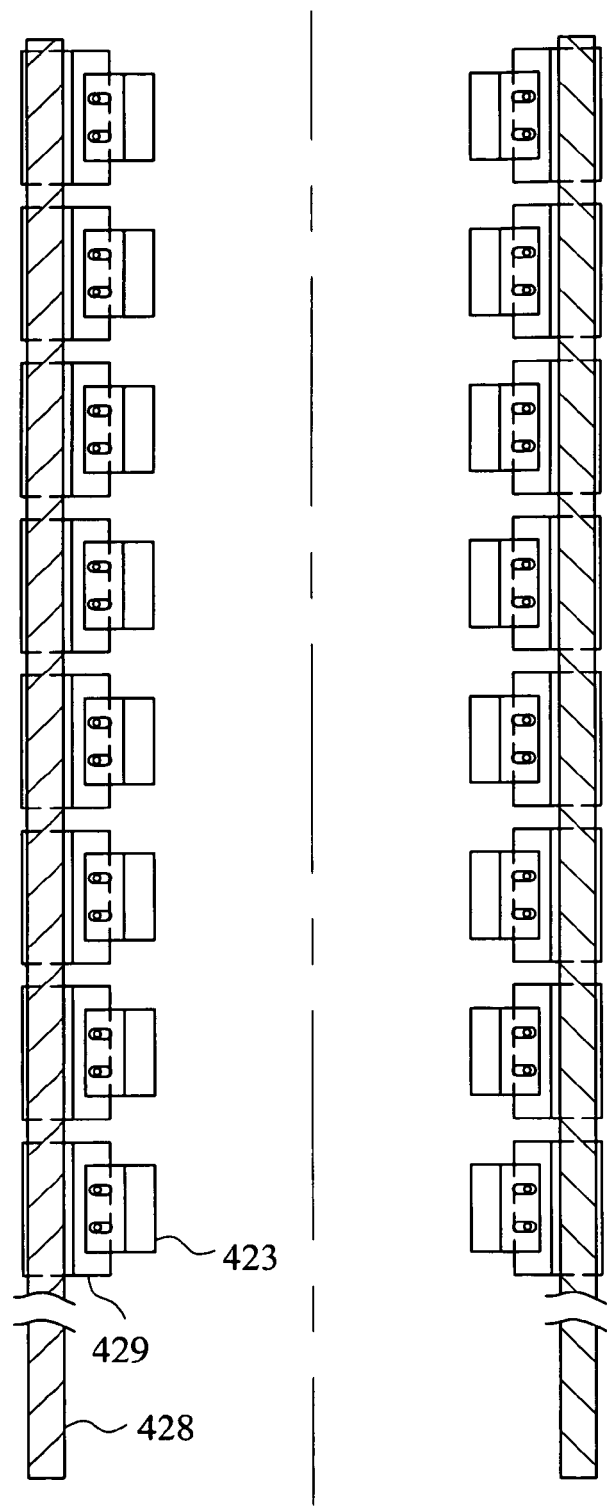
FIG. 17 is a schematic top view showing the connection of the package retaining mechanisms to a plurality of retaining mechanism holders and an elongated key.

FIG. 17 shows the plurality of retaining mechanisms 423 are separately connected to the retaining mechanism holders 429, which are further connected to the elongated key 428.

Figure 18:
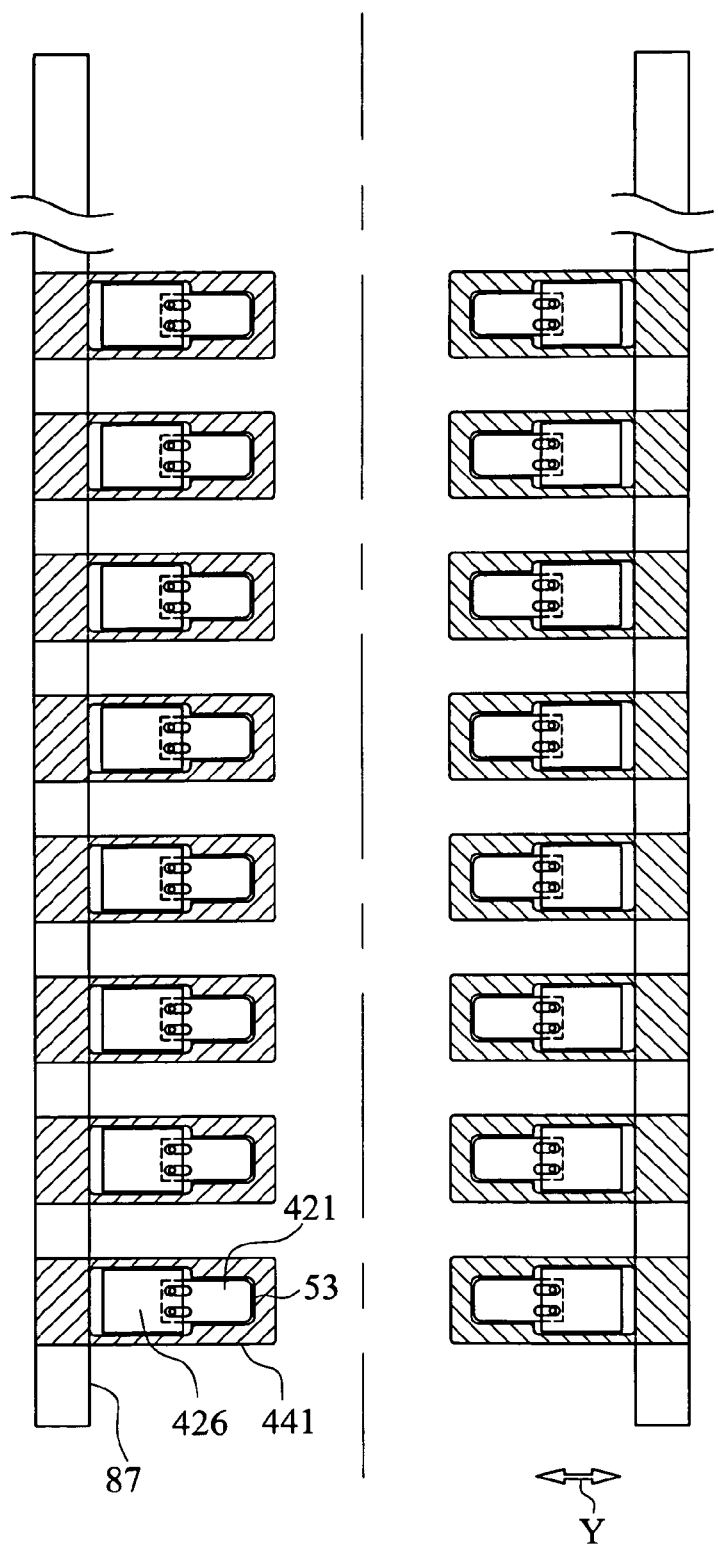
FIG. 18 is a schematic top view showing the positional relation between the supporting fingers, a plurality of supporting finger holders, the carrier seats and a transverse bar.

FIG. 18 shows the plurality of supporting fingers 421 are separately connected to the supporting finger holders 426. The carrier seats 441 each is provided with a cut opening 53, within which the supporting fingers 421 can be turned under the control of the upper extension controller 422a of FIG. 15 without interfering with the carrier seats 441. The plurality of carrier seats 441 are separately connected to a transverse bar 87.

Figure 19:
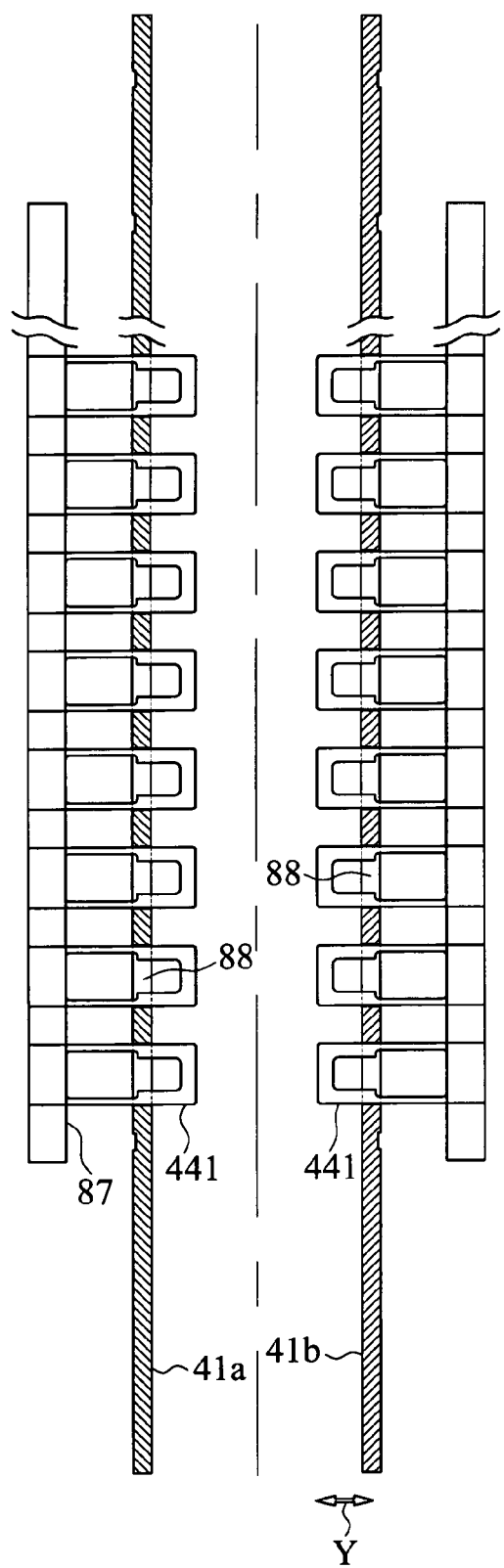
FIG. 19 is a schematic top view showing the positional relation between of the carrier seats and a pair of upright plates.

Please refer to FIG. 19 along with FIG. 5. The upright plates 41a, 41b are separately formed with a plurality of open channels 88, such that the carrier seats 441 can move in the open channels 88 not only in the horizontal direction Y within a predetermined distance, but also in the vertical direction Z within a predetermined distance.

Please refer back to FIG. 4. The supporting finger driving mechanism 43 is used to control the supporting fingers 421 and the retaining mechanisms 423 to operate. The supporting finger driving mechanism 43 includes a first servomotor 31, which is connected to the left table 16a or other proper position via connecting elements (not shown). Via a belt 31a, the first servomotor 31 brings a first screw 32 to rotate. The first screw 32 is connected to the upright plate 41a via connecting elements. Via a first connecting seat 33, a nut 32a mounted on the first screw 32 is associated with a slide block 34a mounted on a first sliding rail 34. Therefore, the slide block 34a and the nut 32a can synchronously displace in the vertical direction Z within a predetermined distance. The first sliding rail 34 is connected to the upright plate 41a. The first connecting seat 33 is also connected to the extension controller plate 35. Since the shaft rod 425, the upper extension controller 422a, and the lower extension controller 422b are separately directly or indirectly connected to the extension controller plate 35, they can synchronously move in the vertical direction Z along with the nut 32a on the first screw 32 within a predetermined distance. As can be seen from FIG. 6, via a belt 51, the first screw 32 can transmit power to a second screw 52.

In brief, according to FIG. 4, the first servomotor 31 brings the extension controller plate 35, the shaft rod 425, the upper extension controller 422a, and the lower extension controller 422b to simultaneously ascend or descend in the vertical direction Z within a predetermined distance. And, by extending or retracting the upper extension controller arm 423a and the lower extension controller arm 423b, the supporting fingers 421 and the retaining mechanisms 423, respectively, are controlled to operate.

Also refer to FIG. 4. A connecting block 72 is connected to the shaft rod 425 and to a slide block 71a mounted on a fifth sliding rail 71, which is fixed to the upright plate 41a. Therefore, the slide block 71a on the fifth sliding rail 71 and the slide block 34a on the first sliding rail 34 can synchronously move in the vertical direction Z within a predetermined distance, enabling the supporting fingers 421 and the retaining mechanisms 423 to operate smoothly.

The carrier seat driving mechanism 45 is used to control the operation of the carrier seats 441, and includes a second servomotor 55. The second servomotor 55 is connected to the upright plate 41*a* or other proper position via connecting elements (not shown) for bringing a third screw 56 to rotate. The third screw 56 is connected to the upright plate 41*a* via connecting elements. Via a third connecting seat 58, a nut 56*a* mounted on the third screw 56 is connected with a slide block 59*a* mounted on a third sliding rail 59 and a slide block 81*a* mounted on a seventh sliding rail 81, so that the slide block 59*a*, the slide block 81*a*, and the nut 56*a* can synchronously move in the vertical direction Z within a predetermined distance. The third sliding rail 59 and the seventh sliding rail 81 are separately connected to the upright plate 41*a*.

Please refer to FIG. 20 along with FIG. 4. The third connecting seat 58 is not only connected to the slide block 81*a* on the seventh sliding rail 81, but also to a base 91, so that the base 91 can move along with the nut 56*a* in the vertical direction Z within a predetermined distance. As can be seen from FIG. 20, each of the carrier seats 441 is connected to the transverse bar 87, which is further connected to a side plate 92. The side plate 92 is fixed to a slide block 94*a* mounted on a horizontal sliding rail 94, and the horizontal sliding rail 94 is fixedly mounted to the base 91. The side plate 92 is also connected to the horizontal-extension controller 442, which is also connected to the base 91.

In brief, as can be seen from FIG. 21, the carrier seats 441 can, on the one hand, together with the horizontal-extension controller 442, move along with the base 91 in the vertical direction Z within a predetermined distance; and, on the other hand, be brought by the extending or retracting of a horizontal-extension controller arm 442*a* to stably move in the horizontal direction Y within a predetermined distance. FIG. 20 shows the horizontal-extension controller arm 442*a* is retracted, so that the carrier seat 441 is located at a carrying position E; and FIG. 21 shows the horizontal-extension controller arm 442*a* is extended, so that the carrier seat 441 is located at a retracted position F.

Figure 22:
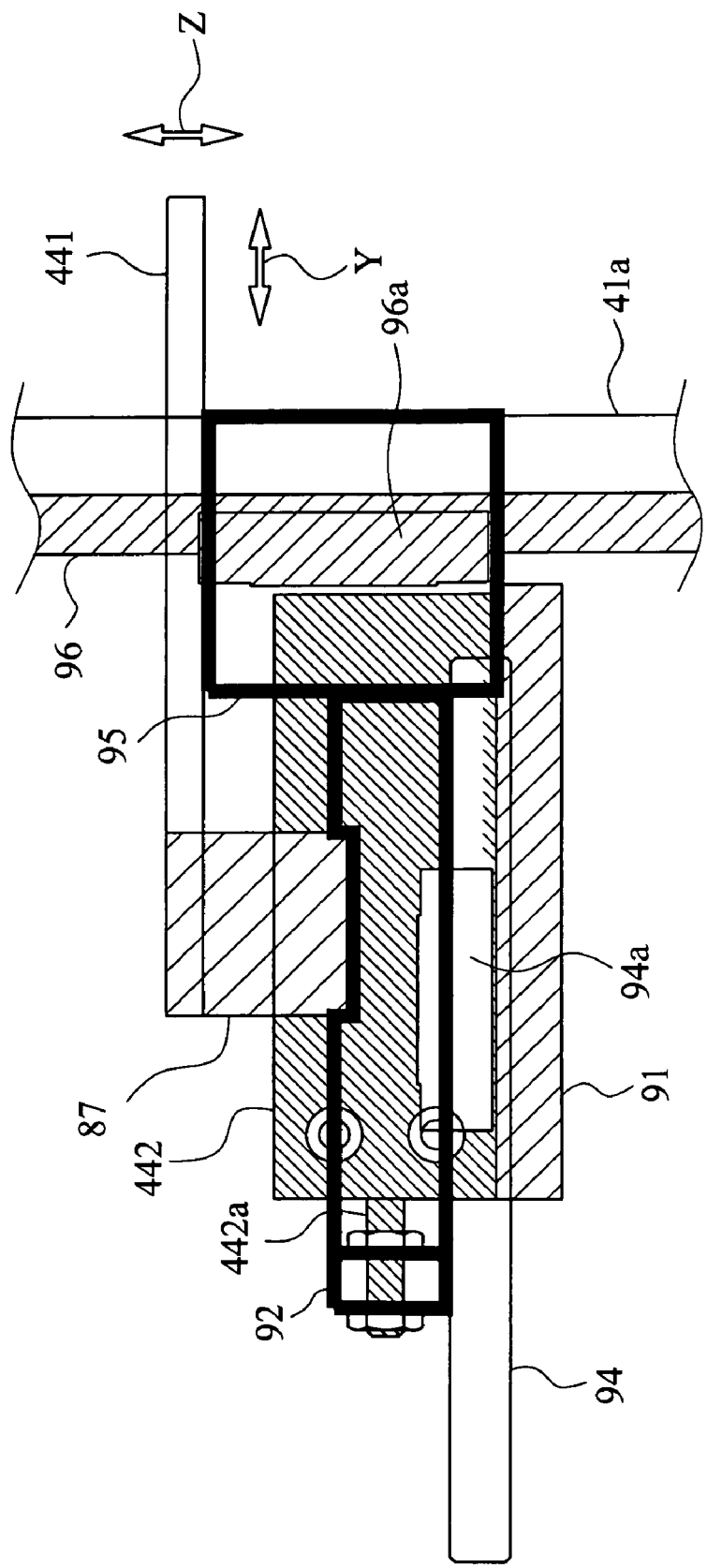
FIG. 22 is a schematic side view showing the positional relation between the carrier seats, the horizontal-extension controller, a vertical connecting plate and a horizontal rail.

Please refer to FIG. 22 along with FIG. 4. A vertical connecting plate 95 is connected to a slide block 96*a* mounted on a carriage sliding rail 96 and a base 91 at the same time, so that the carrier seats 441 and the slide blocks 81*a*, 96*a* can maintain in a balanced condition when they ascend and descend in the vertical direction Z. In addition, the carrier seats 441, the transverse bar 87, the side plate 92, the horizontal-extension controller 442, the horizontal-extension controller arm 442*a*, the horizontal sliding rail 94 and the slide block 94*a* operate in the same manner as that shown in FIG. 20. As can be seen from FIG. 6, these parts are symmetrically arranged at two opposite sides of a centerline L1 of the temporary storage trough 41. Therefore, the carrier seats 441 and the slide blocks 81*a*, 96*a* (as shown in FIG. 4) can synchronously ascend or descend in the vertical direction Z within a predetermined distance.

In brief, the second servomotor 55 controls the carrier seats 441 to ascend or descend in the vertical direction Z within a predetermined distance, while the horizontal-extension controller 442 controls the carrier seats 441 to move in the horizontal direction Y within a predetermined distance, as can be seen in FIG. 5. The third screw 56 transmits power to a fourth screw 62 via a belt 51*a*, as shown in FIG. 6.

Figure 23:
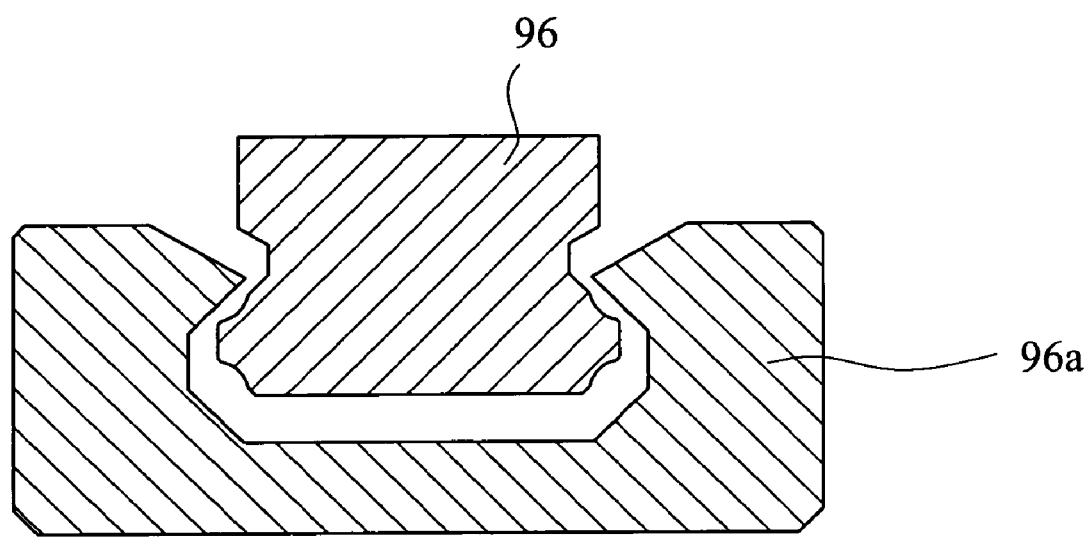
FIG. 23 is a cross sectional views showing a sliding rail and a slide block mounted thereon.

FIG. 23 is a cross sectional view showing the carriage sliding rail 96 and the slide block 96*a* mounted thereon. The slide block 96*a* is slidable on and along the carriage sliding rail 96. All the slide blocks and sliding rails used in the present invention can be products available in the market, while the cross sectional shapes of these parts can be varied depending on the manufacturers' specifications or actual need in use.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A package temporary storage control mechanism for a cuboidal package conveying apparatus, being located between a feeding end and a discharge end of the conveying apparatus for a plurality of cuboidal packages fed into the conveying apparatus at the feeding end to move through the package temporary storage control mechanism before being discharged at the discharge end; the package temporary storage control mechanism comprising:

a temporary storage trough that includes a pair of upright plates; the upright plates each being divided into a supporting section and a waiting section located below the supporting section; a supporting zone being defined between the supporting sections of the two upright plates, and a waiting zone being defined between the waiting sections of the two upright plates;

a pair of supporting mechanisms; each of the supporting mechanisms including a plurality of supporting fingers, and the supporting fingers being controlled by an extension controller to locate at a supporting position or a releasing position; the supporting fingers located at the supporting position being extended into the supporting zone of the temporary storage trough to receive and support the cuboidal packages moved from the feeding end to the supporting zone;

a supporting finger driving mechanism being coupled with the supporting mechanisms for driving the supporting mechanisms to ascend and descend in a vertical direction in the supporting zone of the temporary storage trough;

a pair of carrying mechanisms; each of the carrying mechanisms including a plurality of carrier seats, and the carrier seats being controlled by at least one horizontal-extension controller to locate at a carrying position or a retracted position; the carrier seats located at the carrying position being extended into the waiting zone of the temporary storage trough, so as to carry the cuboidal packages that are moved downward from the supporting zone of the temporary storage trough when the supporting fingers are located at the releasing position; and a carrier seat driving mechanism being coupled with the carrying mechanisms for driving the carrying mechanisms to ascend and descend in the vertical direction in the waiting zone of the temporary storage trough;

whereby when the carrying mechanisms are driven by the carrier seat driving mechanism to move to a bottom of the waiting zone of the temporary storage trough, the cuboidal packages being carried by the carrier seats to the waiting zone of the temporary storage trough can be discharged via the discharge end of the cuboidal package conveying apparatus.

2. The package temporary storage control mechanism as claimed in claim 1, wherein the carrier seats of the carrying mechanisms each are formed with a cut opening, within which the supporting fingers can be separately turned under control of the extension controller.

3. The package temporary storage control mechanism as claimed in claim 1, wherein the supporting mechanisms each further includes a plurality of retaining mechanisms, and the retaining mechanisms being controlled by the extension controller to locate at a retaining position or an opening position; the retaining mechanisms at the retaining position being extended into the supporting zone of the temporary storage trough for retaining the cuboidal packages fed from the feeding end to the supporting zone.

4. The package temporary storage control mechanism as claimed in claim 1, wherein one of the two upright plates of the temporary storage trough is movable and can be controlled to move and thereby adjust a distance between the movable upright plate and the other upright plate.

5. The package temporary storage control mechanism as claimed in claim 1, wherein the temporary storage trough is internally provided with a movable upright guide plate and a fixed upright guide plate, which are parallel with each other; the movable and the fixed upright guide plate being extended in a direction the same as an extending direction of the two upright plates, and the movable upright guide plate being movable under control to thereby adjust a distance between the movable and the fixed upright guide plate; and the cuboidal packages being vertically descended from a top of the temporary storage trough between and along the movable and the fixed upright guide plate.

6. An operating method of a package temporary storage control mechanism for a cuboidal package conveying apparatus, the package temporary storage control mechanism being located between a feeding end and a discharge end of the conveying apparatus, and including a temporary storage trough, a pair of supporting mechanisms, and a pair of carrying mechanisms; the temporary storage trough including a pair of upright plates, each of which having a supporting section and a waiting section below the supporting section; the supporting sections of the two upright plates defining a supporting zone therebetween, and the waiting sections of the two upright plates defining a waiting zone therebetween; the supporting mechanisms each including a plurality of supporting fingers and at least one extension controller mechanism; the carrying mechanisms each including a plurality of carrier seats and at least one horizontal-extension controller; the operating method of the package temporary storage control mechanism for a cuboidal package conveying apparatus comprising the following steps:
  (a) the supporting fingers of the supporting mechanisms being controlled by the extension controller mechanism to locate at a supporting position for receiving and supporting predetermined layers of cuboidal packages sequentially fed from the feeding end of the conveying apparatus to the supporting zone;
  (b) the carrier seats of the carrying mechanisms being controlled by the horizontal-extension controller to a carrying position for carrying the predetermined layers of cuboidal packages transferred from the supporting fingers of the supporting mechanisms to the carrier seats; and
  (c) the carrier seats of the carrying mechanisms carrying the predetermined layers of cuboidal packages as one batch to the waiting zone.

7. The method as claimed in claim 6, wherein the supporting mechanisms each is driven by a supporting finger driving mechanism coupled therewith to ascend and descend in a vertical direction in the supporting zone of the temporary storage trough, and the carrying mechanisms each is driven by a carrier seat driving mechanism coupled therewith to ascend and descend in the vertical direction in the waiting zone of the temporary storage trough; the carrier seats of the carrying mechanisms each is formed with a cut opening; the two upright plates are provided at positions corresponding to the carrier seats with an open channel each; and the supporting mechanisms each further include a plurality of retaining mechanisms.

8. The operating method as claimed in claim 6, wherein the step (b) further includes the following steps:
  (b1) the carrier seat driving mechanism driving the carrying mechanisms to ascend in the vertical direction from the waiting zone of the temporary storage trough to the supporting zone of the temporary storage trough;
  (b2) the extension controller mechanism controlling the supporting fingers to locate at a releasing position, so that the predetermined layers of cuboidal packages are transferred from the supporting fingers to the carrier seats of the carrying mechanisms;
  (b3) the supporting finger driving mechanism driving the supporting mechanisms for the supporting fingers and the retaining mechanisms of the supporting mechanisms to ascend in the vertical direction to a predetermined position; and
  (b4) the extension controller mechanisms controlling the retaining mechanisms to retain a new layer of cuboidal packages sent to the supporting zone and located atop the batch of the predetermined layers of cuboidal packages.

9. The operating method as claimed in claim 8, further comprising a step:
  (d) the extension controller mechanisms controlling the supporting fingers to locate at the supporting position for receiving and supporting the new layer of cuboidal packages retained by the retaining mechanisms.

10. The method as claimed in claim 9, further comprising a step of controlling the retaining mechanisms with the extension controller mechanisms for the retaining mechanisms to separate from the new layer of cuboidal packages after step (d).

11. The method as claimed in claim 8, wherein the step (b4) further includes a step of driving the supporting mechanisms with the supporting finger driving mechanism for the supporting mechanisms to slowly descend in the vertical direction during the course of receiving and supporting the cuboidal packages, and wherein the supporting mechanisms descend at a rate the same as a rate at which the layers of cuboidal packages are moved downward to the supporting mechanisms layer by layer.

12. The method as claimed in claim 9, wherein the step (d) further comprises a step of using the horizontal-extension controllers to control the carrier seats to horizontally move out of the temporary storage trough via the open channels on the upright plates, so that the carrier seats are located at a retracted position.

13. The method as claimed in claim 12, further comprising a step:
  (e) The carrier seat driving mechanism driving the carrying mechanisms to ascend in the vertical direction to a predetermined position.

14. The operating method of a package temporary storage control mechanism as claimed in claim 13, further comprising a step:
  (f) the horizontal-extension controllers controlling the carrier seats to horizontally extend into the temporary storage trough via the open channels on the upright plates, so that the carrier seats are located at the carrying position.

* * * * *